(12) United States Patent
Kikuchi et al.

(10) Patent No.: US 11,993,725 B2
(45) Date of Patent: May 28, 2024

(54) BARRIER FILMS AND QUANTUM DOT POLYMER COMPOSITE ARTICLES INCLUDING THE SAME

(71) Applicant: SAMSUNG ELECTRONICS CO., LTD., Suwon-si (KR)

(72) Inventors: Tomoyuki Kikuchi, Hwaseong-si (KR); EunJoo Jang, Suwon-si (KR); Hyun A Kang, Suwon-si (KR); Nayoun Won, Suwon-si (KR); Oul Cho, Suwon-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 227 days.

(21) Appl. No.: 16/812,447

(22) Filed: Mar. 9, 2020

(65) Prior Publication Data

US 2020/0208011 A1    Jul. 2, 2020

Related U.S. Application Data

(62) Division of application No. 15/042,983, filed on Feb. 12, 2016, now abandoned.

(30) Foreign Application Priority Data

Mar. 11, 2015    (KR) .................. 10-2015-0033992

(51) Int. Cl.
C09D 181/00 (2006.01)
B32B 1/08 (2006.01)
(Continued)

(52) U.S. Cl.
CPC .............. *C09D 181/00* (2013.01); *B32B 1/08* (2013.01); *B32B 7/04* (2013.01); *B32B 15/082* (2013.01);
(Continued)

(58) Field of Classification Search
None
See application file for complete search history.

(56) References Cited

U.S. PATENT DOCUMENTS 6,268,695 B1    7/2001    Affinito
7,648,925 B2    1/2010    Moro et al.
(Continued)

FOREIGN PATENT DOCUMENTS

JP    2003139698 A    5/2003
JP    2013162072    8/2013
(Continued)

OTHER PUBLICATIONS

CAS Registry No. 7575-23-7 Scifinder (ACS) 2022.*
(Continued)

*Primary Examiner* — Kenneth J Stachel
(74) *Attorney, Agent, or Firm* — CANTOR COLBURN LLP

(57) ABSTRACT

A barrier film comprising: a substrate; a first layer disposed on the substrate and comprising an oxidation product of polysilazane; and a second layer disposed directly on the first layer and comprising a thiol-ene polymer, wherein the polysilazane comprises a repeating unit represented by Chemical Formula 1, Chemical Formula 1

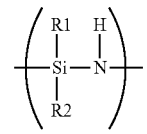

wherein $R^1$ and $R^2$ are each independently hydrogen, an aliphatic hydrocarbon group, an alicyclic hydrocarbon
(Continued)

group, an alkylsilyl group, an alkylamino group, an alkoxy group, or an aromatic hydrocarbon group, and wherein the thiol-ene polymer is a polymerization product of a monomer combination including a first monomer having at least two thiol groups at its terminal end and a second monomer having at least two carbon-carbon unsaturated bond-containing groups at its terminal end.

8 Claims, 8 Drawing Sheets

(51) Int. Cl.
| | |
|---|---|
| B32B 7/04 | (2019.01) |
| B32B 15/082 | (2006.01) |
| B32B 15/092 | (2006.01) |
| B32B 15/095 | (2006.01) |
| B32B 15/20 | (2006.01) |
| B32B 17/00 | (2006.01) |
| B32B 27/00 | (2006.01) |
| B32B 27/08 | (2006.01) |
| B32B 27/18 | (2006.01) |
| B32B 27/20 | (2006.01) |
| B32B 27/28 | (2006.01) |
| B32B 27/30 | (2006.01) |
| B32B 27/32 | (2006.01) |
| B32B 27/34 | (2006.01) |
| B32B 27/36 | (2006.01) |
| B32B 27/38 | (2006.01) |
| C09D 183/16 | (2006.01) |
| C09K 11/02 | (2006.01) |
| C09K 11/62 | (2006.01) |
| C08G 77/62 | (2006.01) |

(52) U.S. Cl.
CPC .......... *B32B 15/092* (2013.01); *B32B 15/095* (2013.01); *B32B 15/20* (2013.01); *B32B 17/00* (2013.01); *B32B 27/00* (2013.01); *B32B 27/08* (2013.01); *B32B 27/18* (2013.01); *B32B 27/20* (2013.01); *B32B 27/281* (2013.01); *B32B 27/285* (2013.01); *B32B 27/286* (2013.01); *B32B 27/288* (2013.01); *B32B 27/30* (2013.01); *B32B 27/302* (2013.01); *B32B 27/304* (2013.01); *B32B 27/308* (2013.01); *B32B 27/32* (2013.01); *B32B 27/325* (2013.01); *B32B 27/34* (2013.01); *B32B 27/36* (2013.01); *B32B 27/365* (2013.01); *B32B 27/38* (2013.01); *C09D 183/16* (2013.01); *C09K 11/02* (2013.01); *C09K 11/623* (2013.01); *B32B 2250/03* (2013.01); *B32B 2255/10* (2013.01); *B32B 2255/20* (2013.01); *B32B 2255/26* (2013.01); *B32B 2255/28* (2013.01); *B32B 2264/10* (2013.01); *B32B 2270/00* (2013.01); *B32B 2307/412* (2013.01); *B32B 2307/422* (2013.01); *B32B 2307/7242* (2013.01); *B32B 2307/7244* (2013.01); *B32B 2307/7265* (2013.01); *B32B 2307/728* (2013.01); *B32B 2307/732* (2013.01); *B32B 2457/12* (2013.01); *B32B 2457/202* (2013.01); *C08G 77/62* (2013.01)

(56) References Cited

U.S. PATENT DOCUMENTS

| | | | |
|---|---|---|---|
| 7,985,607 B2 | 7/2011 | Kim et al. | |
| 8,440,736 B2 | 5/2013 | Hoyle et al. | |
| 8,771,834 B2 | 7/2014 | Uemura et al. | |
| 8,823,154 B2 | 9/2014 | Hawker et al. | |
| 8,846,200 B2 | 9/2014 | Ito et al. | |
| 8,871,350 B2 | 10/2014 | Nakayama | |
| 9,070,838 B2 | 6/2015 | Jang et al. | |
| 2006/0069176 A1 | 3/2006 | Bowman et al. | |
| 2007/0190308 A1 | 8/2007 | Brand et al. | |
| 2008/0194721 A1* | 8/2008 | Arney | G03F 7/0757 522/63 |
| 2009/0253805 A1 | 10/2009 | Hoyle et al. | |
| 2012/0107607 A1 | 5/2012 | Takaki et al. | |
| 2012/0113672 A1* | 5/2012 | Dubrow | G02B 6/0061 977/774 |
| 2012/0301635 A1 | 11/2012 | Hasegawa et al. | |
| 2013/0122217 A1 | 5/2013 | Akagi | |
| 2013/0280521 A1 | 10/2013 | Mori | |
| 2014/0127518 A1 | 5/2014 | Ishikawa et al. | |
| 2014/0154518 A1 | 6/2014 | Kikuchi et al. | |
| 2014/0199544 A1 | 7/2014 | Naganawa et al. | |
| 2015/0004421 A1 | 1/2015 | Fujiwara et al. | |
| 2015/0064401 A1 | 3/2015 | Honda | |
| 2015/0380681 A1* | 12/2015 | Furukawa | H10K 50/854 257/40 |
| 2016/0155988 A1* | 6/2016 | Kuroki | H10K 50/858 257/40 |
| 2016/0264820 A1 | 9/2016 | Kikuchi et al. | |

FOREIGN PATENT DOCUMENTS

| | | |
|---|---|---|
| JP | 5470969 | 2/2014 |
| JP | 2014223578 | 12/2014 |
| KR | 1020060126582 | 12/2006 |
| KR | 10-20080012552 A | 2/2008 |
| KR | 10-20120031228 A | 3/2012 |
| KR | 10-20120137136 A | 12/2012 |
| KR | 1020140063518 | 5/2014 |
| KR | 101462652 | 11/2014 |
| WO | 2012011377 | 1/2012 |
| WO | 2013147189 A1 | 10/2013 |
| WO | 2013150997 | 10/2013 |

OTHER PUBLICATIONS

CAS Registry No. 1112-55-6 Scifinder (ACS) 2022.*
Hui Zhou, et al., "Effects of Monomer Funtionality and Hydrogen Bonding on the Polymerization Kinetics and Properties of Thion-Ene Networks", Macromolecules 2009, 42, 2994-2999.
Joonwon Bae, et al., "Thiol-ene/clay nanocomposite thin film as novel trasparent barrier", Polyn In 2012, 61, 895-900.
Joonwon Bae, et al., "Thiol-ene/hyperbranched polymer hybrid thin films: Cure behavior and gas barrier properties", Journal of Non-Crystalline Solids 357, 2011, 3103-3107.
Scifinder CAPLUS Accession No. 2010 975455 (2010).
Scifinder CAPLUS, Accession No. 20125, 851544 (2012).
T. Oishi, et al., "Preparation and Gas Barrier Characteristics of Polysilazane-Derived Silica Thin Films Using Ultraviolet Irradiation", Materials Sciences and Applications, 2014, 5, 105-111.

* cited by examiner

FIG. 2
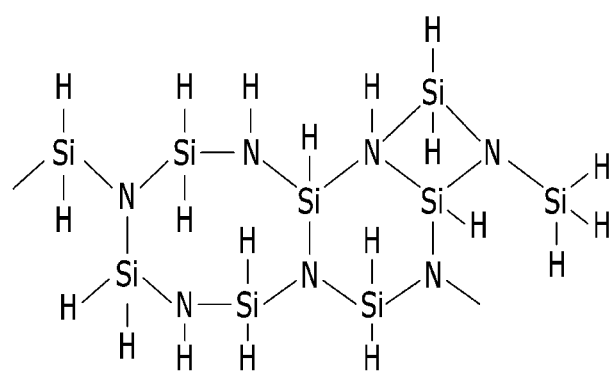
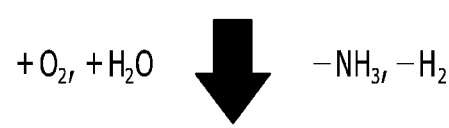
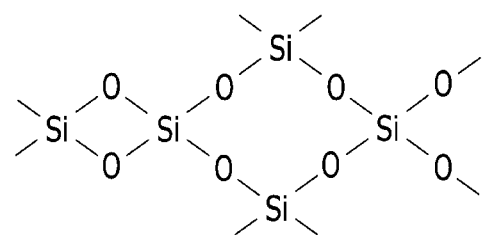

BARRIER FILMS AND QUANTUM DOT POLYMER COMPOSITE ARTICLES INCLUDING THE SAME

CROSS-REFERENCE TO RELATED APPLICATION

This application is a divisional of U.S. patent application Ser. No. 15/042,983, filed Feb. 12, 2016 and claims priority to and the benefit of Korean Patent Application No. 10-2015-0033992 filed in the Korean Intellectual Property Office on Mar. 11, 2015, the content of which is incorporated herein in its entirety by reference.

BACKGROUND

1. Field

Barrier films and quantum dot-polymer composite articles including the same are disclosed.

2. Description of the Related Art

A light emitting particle may be dispersed in a polymer host matrix and applied to various display devices as a composite. For example, a semiconductor nanocrystal also referred to as a quantum dot (QD) is dispersed in a host matrix of a polymer or an inorganic material, and a composite thus prepared may be used as a light conversion layer in a light emitting diode (LED) and the like. Using colloid synthesis, quantum dots may have a particle size that can be relatively freely adjusted and uniformly controlled. When the quantum dot has a size of less than or equal to about 10 nanometers (nm), a quantum confinement effect becomes more significant as the particle size of the quantum dots decreases, and thereby their energy density may increase. Accordingly, the quantum dot may emit light in a visible light region with excellent luminous efficiency, and thus intensive research efforts have been undertaken to apply the quantum dot to various lighting devices, a light-emitting diode (LED) for a backlight unit, and the like.

The quantum dot has theoretical quantum efficiency of about 100%, may emit light with high color purity (e.g., of less than or equal to about 40 nm of a full width at half maximum (FWHM)), and thus is expected to accomplish high luminous efficiency and improved color reproducibility compared to an inorganic phosphor used in a conventional art. However, since the quantum dot has a nano-size, unlike the inorganic phosphor having a micro-size, it has a problem of a short life-span (e.g., vulnerability to an external factor such as moisture or oxygen), and thus, development of technology for overcoming this problem is needed.

When the quantum dot is applied as a quantum dot-polymer composite to a light emitting diode or a quantum dot sheet, it is important to maintain a passivation layer on the surface of the quantum dot well in order to secure its high efficiency and color purity. The quantum dot-polymer composite may have a barrier coating for protecting the quantum dot from moisture or oxygen, and as the barrier coating, a deposited metal oxide (e.g., formed by sputtering and the like) has been widely used. However, a currently-used barrier coating shows an insufficient result in terms of economic or technological aspect.

SUMMARY

An embodiment provides a barrier film that is applicable to a quantum dot polymer composite.

Another embodiment provides a quantum dot-polymer composite article including the aforementioned barrier film.

In an embodiment, a barrier film includes:
a substrate;
a first layer disposed on the substrate and including an oxidation product of polysilazane; and
a second layer disposed directly on the first layer and including a thiolene polymer,
wherein the polysilazane includes a repeating unit represented by Chemical Formula 1.

Chemical Formula 1

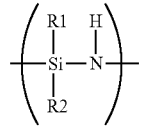

Herein, $R^1$ and $R^2$ are each independently hydrogen, an aliphatic hydrocarbon group, an alicyclic hydrocarbon group, an alkylsilyl group, an alkylamino group, an alkoxy group, or an aromatic hydrocarbon group, and the thiol-ene polymer is a polymerization product of a monomer combination including a first monomer having at least two thiol groups at its terminal end and a second monomer having at least two carbon-carbon unsaturated bond-containing groups at its terminal end.

The substrate may include a polymer, a metal oxide, a metal, or a combination thereof.

The oxidation product of the polysilazane may include a silicon oxide, a silicon oxynitride, a polysiloxane, a polysiloxazane, or a combination thereof.

In the oxidation product of the polysilazane, a ratio of a Si—O moiety to a Si—H moiety determined from FTIR analysis data may be greater than or equal to about 0.1 and less than or equal to about 15.

In the oxidation product of the polysilazane, a ratio of a Si—O moiety to a Si—H moiety determined from FTIR analysis data may be greater than or equal to about 2 and less than or equal to about 13.

The oxidation product of the polysilazane may be a product obtained by treating the polysilazane in contact with oxygen or in contact with oxygen and moisture at a temperature of about 20° C. to about 200° C.

The polysilazane may be treated in contact with a catalyst selected from an amine compound, a platinum compound, a palladium compound, a rhodium compound, and a combination thereof.

The treating may include UV irradiation, heating, or a combination thereof.

In the monomer combination, the first monomer may include a compound represented by Chemical Formula 2.

Chemical Formula 2

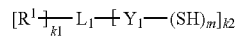

In Chemical Formula 2,
$R^1$ is selected from hydrogen; a substituted or unsubstituted C1 to C30 linear or branched alkyl group; a substituted or unsubstituted C6 to C30 aryl group; a substituted or unsubstituted C3 to C30 heteroaryl group; a substituted or unsubstituted C3 to C30 cycloalkyl group; a substituted or unsubstituted C3 to C30 heterocycloalkyl group; a C1 to C10 alkoxy group; a hydroxy group; —NH$_2$; a substituted or unsubstituted C1 to C30 amine group (—NRR', wherein R and R' are independently hydrogen or a C1 to C30 linear or branched alkyl group); an isocyanate group; a halogen; —ROR' (wherein R is a substituted or unsubstituted C1 to C20 alkylene group and R' is hydrogen or a C1 to C20 linear or branched alkyl group); an acyl halide (—RC(=O)X, wherein R is a substituted or unsubstituted alkylene group and X is a halogen); —C(=O)OR' (wherein R' is hydrogen or a C1 to C20 linear or branched alkyl group); —CN; or —C(=O)ONRR' (wherein R and R' are independently hydrogen or a C1 to C20 linear or branched alkyl group), L$_1$ is a carbon atom, a substituted or unsubstituted C1 to C30 alkylene group, a substituted or unsubstituted C6 to C30 cycloalkylene group, a substituted or unsubstituted C6 to C30 arylene group, or a substituted or unsubstituted C6 to C30 heteroarylene group, wherein at least one methylene (—CH$_2$—) group of the substituted C1 to C30 alkylene group may be replaced by sulfonyl (—SO$_2$—), carbonyl (CO), ether (—O—), sulfide (—S—), sulfoxide (—SO—), ester (—C(=O)O—), amide (—C(=O)NR—) (wherein R is hydrogen or a C1 to C10 alkyl group), or a combination thereof, Y$_1$ is a single bond; a substituted or unsubstituted C1 to C30 alkylene group; a substituted or unsubstituted C2 to C30 alkenylene group; or a C1 to C30 alkylene group or a C2 to C30 alkenylene group wherein at least one methylene (—CH$_2$—) group is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—NR—) (wherein R is hydrogen or a C1 to C10 linear or branched alkyl group), or a combination thereof, m is an integer of 1 or more, k1 is an integer of 1 or more and k2 is an integer of 1 or more, and the sum of m and k2 is an integer of 3 or more, provided that m does not exceed the valence of Y$_1$, and provided that the sum of k1 and k2 does not exceed the valence of L$_1$.

The second monomer may include a compound represented by Chemical Formula 3.

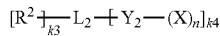

Chemical Formula 3

In Chemical Formula 3,

X is an aliphatic organic group including a carbon-carbon double bond or a carbon-carbon triple bond, an aromatic organic group including a carbon-carbon double bond or a carbon-carbon triple bond, or an alicyclic organic group including a carbon-carbon double bond or a carbon-carbon triple bond, R$^2$ is selected from hydrogen; a substituted or unsubstituted C1 to C30 linear or branched alkyl group; a substituted or unsubstituted C6 to C30 aryl group; a substituted or unsubstituted C3 to C30 heteroaryl group; a substituted or unsubstituted C3 to C30 cycloalkyl group; a substituted or unsubstituted C3 to C30 heterocycloalkyl group; a C1 to C10 alkoxy group; a hydroxy group; NH$_2$; a substituted or unsubstituted C1 to C30 amine group (—NRR', wherein R and R' are independently hydrogen or a C1 to C30 linear or branched alkyl group); an isocyanate group; a halogen; —ROR' (wherein R is a substituted or unsubstituted C1 to C20 alkylene group and R' is hydrogen or a C1 to C20 linear or branched alkyl group); an acyl halide (—RC(=O)X, wherein R is a substituted or unsubstituted alkylene group and X is a halogen); —C(=O)OR' (wherein R' is hydrogen or a C1 to C20 linear or branched alkyl group); —CN; or —C(=O)ONRR' (wherein R and R' are independently hydrogen or a C1 to C20 linear or branched alkyl group), L$_2$ is a carbon atom, a substituted or unsubstituted C1 to C30 alkylene group, a substituted or unsubstituted C6 to C30 cycloalkylene group, a substituted or unsubstituted C6 to C30 arylene group, or a substituted or unsubstituted C3 to C30 heteroarylene group, Y$_2$ is a single bond; a substituted or unsubstituted C1 to C30 alkylene group; a substituted or unsubstituted C2 to C30 alkenylene group; or a C1 to C30 alkylene group or a C2 to C30 alkenylene group wherein at least one methylene (—CH$_2$—) group is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—NR—) (wherein R is hydrogen or a C1 to C10 linear or branched alkyl group), or a combination thereof, n is an integer of 1 or more, k3 is an integer of 0 or more, k4 is an integer of 1 or more, and the sum of n and k4 is an integer of 3 or more, provided that n does not exceed the valence of Y$_2$, and provided that the sum of k3 and k4 does not exceed the valence of L$_2$.

The second layer may further include a plurality of clay particles dispersed in the thiol-ene polymer.

The first layer may have a thickness of greater than or equal to about 50 nanometers and less than or equal to about 2 micrometers.

The second layer may have a thickness of greater than or equal to about 5 micrometers and less than or equal to about 300 micrometers.

In another embodiment, a quantum dot-polymer composite article includes:

a quantum dot-polymer composite including a polymer host matrix and a plurality of quantum dots dispersed in the polymer host matrix; and a barrier film disposed on at least a portion of the surface of the quantum dot polymer composite, wherein the barrier film includes:

a substrate;

a first layer disposed on the substrate and including an oxidation product of polysilazane; and a second layer disposed directly on the first layer and including a thiol-ene polymer, wherein the polysilazane includes a repeating unit represented by Chemical Formula 1.

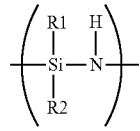

Chemical Formula 1

Herein, R$^1$ and R$^2$ are each independently hydrogen, an aliphatic hydrocarbon group, an alicyclic hydrocarbon group, an alkylsilyl group, an alkylamino group, an alkoxy group, or an aromatic hydrocarbon group, and the thiol-ene polymer is a polymerization product of a monomer combination including a first monomer having at least two thiol groups at its terminal end and a second monomer having at least two carbon-carbon unsaturated bond-containing groups at its terminal end, wherein the barrier film is disposed in such a manner that a surface of the second layer faces at least a portion of a surface of the quantum dot-polymer matrix.

The polymer host matrix may include a thiol-ene polymer, a cross-linked or non-cross-linked poly(meth)acrylate, a melamine (meth)acrylate polymer, an epoxy polymer, an epoxy(meth)acrylate polymer, a silicone polymer, a silicon (meth)acrylate polymer, a polyurethane(meth)acrylate, a vinyl polymer, or a combination thereof.

The quantum dot-polymer composite may have a sheet shape, a bar shape, a pipe shape, or a tube shape.

The oxidation product of the polysilazane may include a silicon oxide, a silicon oxynitride, a polysiloxane, a polysiloxazane, or a combination thereof.

In the oxidation product of the polysilazane, a ratio of a Si—O moiety to a Si—H moiety determined from FTIR analysis data may be greater than or equal to about 0.1 and less than or equal to about 15.

In another embodiment, an electronic device includes the aforementioned quantum dot-polymer composite article.

The electronic device may be a display, a light emitting device, a memory device, a laser device, or a solar cell.

The light emitting device includes a light source and the article disposed on the light source.

According to some embodiments, the barrier film may be prepared without using expensive equipment, and when the barrier film is applied to a quantum dot polymer composite, its long term reliability may be comparable to that of the conventional barrier film based on a metal oxide.

BRIEF DESCRIPTION OF THE DRAWINGS

The above and other aspects, advantages and features of this disclosure will become more apparent by describing in further detail exemplary embodiments thereof with reference to the accompanying drawings, in which:

FIG. 2 shows an exemplary reaction scheme for the formation of the oxidation product of the polysilazane;

DETAILED DESCRIPTION

Figure 1:
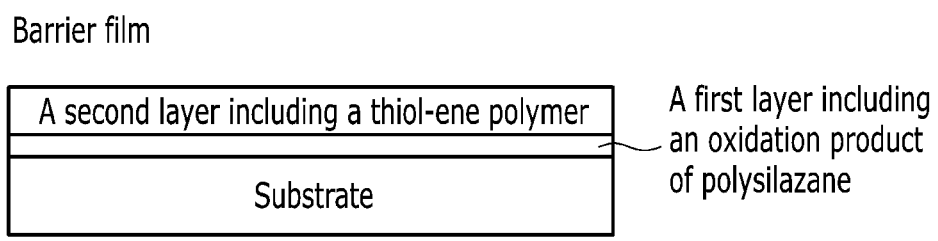
FIG. 1 schematically shows a cross-sectional view of a barrier film according to an embodiment.

This disclosure will be described more fully hereinafter in the following detailed description, in which some but not all embodiments of this disclosure are described. This disclosure may be embodied in many different forms and is not to be construed as limited to the embodiments set forth herein; rather, these embodiments are provided so that this disclosure will fully convey the scope of the present inventive concept to those skilled in the art. Thus, in some exemplary embodiments, well-known technologies are not specifically explained to avoid ambiguous understanding of the present inventive concept. Accordingly, the exemplary embodiments are merely described below, by referring to the figures, to explain aspects of the present inventive concept. Expressions such as "at least one of," when preceding a list of elements, modify the entire list of elements and do not modify the individual elements of the list. Unless otherwise defined, all terms used in the specification (including technical and scientific terms) may be used with meanings commonly understood by a person having ordinary knowledge in the art to which this inventive concept belongs. Further, unless explicitly defined to the contrary, the terms defined in a generally-used dictionary should be interpreted as having a meaning that is consistent with their meaning in the context of the relevant art and the present disclosure, and are not ideally or excessively interpreted. In addition, unless explicitly described to the contrary, the word "comprise" and variations such as "comprises" or "comprising", and the word "include" and variations such as "includes" or "including", when used in this specification, specify the presence of stated features, regions, integers, steps, operations, elements, and/or components, but do not preclude the presence or addition of one or more other features, regions, integers, steps, operations, elements, components, and/or groups thereof. Therefore, the above words will be understood to imply the inclusion of stated elements but not the exclusion of any other elements.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As stated above, unless specifically described to the contrary, a singular form includes a plural form.

In the drawings, the thickness of layers, films, panels, regions, etc., are exaggerated for clarity. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, when a definition is not otherwise provided, the term "substituted" refers to a compound or group wherein at least one of hydrogen atoms thereof is substituted with a substituent selected from a C1 to C30 alkyl group, a C2 to C30 alkynyl group, a C6 to C30 aryl group, a C7 to C30 alkylaryl group, a C1 to C30 alkoxy group, a C1 to C30 heteroalkyl group, a C3 to C30 heteroalkylaryl group, a C3 to C30 cycloalkyl group, a C3 to C15 cycloalkenyl group, a C6 to C30 cycloalkynyl group, a C2 to C30 heterocycloalkyl group, a halogen (—F, —Cl, —Br, or —I), a hydroxy group (—OH), a nitro group (—NO$_2$), a cyano group (—CN), an amino group (—NRR' wherein R and R' are independently hydrogen or a C1 to C6 alkyl group), an azido group (—N$_3$), an amidino group (—C(=NH)NH$_2$), a hydrazino group (—NHNH$_2$), a hydrazono group (=N(NH$_2$), an aldehyde group (—C(=O)H), a carbamoyl group (—C(O)NH$_2$), a thiol group (—SH), an ester group (—C(=O)OR, wherein R is a C1 to C6 alkyl group or a C6 to C12 aryl group), a carboxyl group (—COOH) or a salt thereof (—C(=O)OM, wherein M is an organic or inorganic cation), a sulfonic acid group (—SO$_3$H) or a salt thereof (—SO$_3$M, wherein M is an organic or inorganic cation), a phosphoric acid group (—PO$_3$H$_2$) or a salt thereof (—PO$_3$MH or —PO$_3$M$_2$, wherein M is an organic or inorganic cation), and a combination thereof.

When a group containing a specified number of carbon atoms is substituted with any of the substituents listed above, the number of carbon atoms in the resulting "substituted" group may be the number of atoms contained in the original (base) group plus the number of carbon atoms (if any) contained in the substituent. For example, the "substituted C1-C30 alkyl" may refer to a C1-C30 alkyl group substituted with C6-30 aryl group, in which the total number of carbon atoms may be C7-C60.

As used herein, the term "monovalent organic functional group" refers to a C1 to C30 alkyl group, a C2 to C30 alkynyl group, a C6 to C30 aryl group, a C7 to C30 alkylaryl group, a C1 to C30 alkoxy group, a C1 to C30 heteroalkyl group, a C3 to C30 heteroalkylaryl group, a C3 to C30 cycloalkyl group, a C3 to C15 cycloalkenyl group, a C6 to C30 cycloalkynyl group, or a C2 to C30 heterocycloalkyl group.

As used herein, the term "hetero" refers to inclusion of one to three heteroatoms selected from N, O, S, Si, and P.

As used herein, the term "alkyl group" may refer to a group derived from a straight or branched chain saturated aliphatic hydrocarbon having the specified number of carbon atoms and having a valence of at least one.

As used herein, the term "alkoxy group" may refer to "alkyl-O—", wherein the term "alkyl" has the same meaning as described above.

As used herein, the term "alkenyl group" may refer to a straight or branched chain, monovalent hydrocarbon group having at least one carbon-carbon double bond.

As used herein, the term "alkynyl group" may refer to a straight or branched chain, monovalent hydrocarbon group having at least one carbon-carbon triple bond.

As used herein, the term "cycloalkyl group" may refer to a monovalent group having one or more saturated rings in which all ring members are carbon.

As used herein, the term "aryl", which is used alone or in combination, may refer to an aromatic hydrocarbon containing at least one ring and having the specified number of carbon atoms. The term "aryl" may be construed as including a group with an aromatic ring fused to at least one cycloalkyl ring.

The term "heteroaryl group" may refer to an aryl group including carbon and 1 to 3 heteroatoms selected from the group consisting of N, O, S, and P as ring atoms.

As used herein, the term "alkylene group" refers to a linear or branched saturated aliphatic hydrocarbon group having a valence of at least two, optionally substituted with one or more substituents.

As used herein, the term "alkenylene group" may refer to a straight or branched aliphatic hydrocarbon group having a valence of at least two, having at least one carbon-carbon double bond, optionally substituted with one or more substituents.

As used herein, the term "cycloalkylene group" may refer to a cyclic hydrocarbon group having a valence of at least two, optionally substituted with one or more substituents.

As used herein, the term "arylene group" refers to a functional group having a valence of at least two obtained by removal of two hydrogens in an aromatic ring, optionally substituted with one or more substituents.

As used herein, the term "heteroarylene group" may refer to a functional group having a valence of at least two obtained by removal of two hydrogens in an aromatic ring, containing one to three heteroatoms selected from the group consisting of N, O, S, Si, and P as ring-forming elements, optionally substituted with one or more substituents.

The term "aliphatic organic group" refers to a C1 to C30 linear or branched alkyl group, the term "aromatic organic group" refers to a C6 to C30 aryl group or a C2 to C30 heteroaryl group, and the term "alicyclic organic group" refers to a C3 to C30 cycloalkyl group, a C3 to C30 cycloalkenyl group, or a C3 to C30 cycloalkynyl group. The term "carbon-carbon unsaturated bond-containing substituent" refers to a C2 to C20 alkenyl group including at least one carbon-carbon double bond, a C2 to C20 alkynyl group including at least one carbon-carbon triple bond, a C6 to C18 cycloalkenyl group including at least one carbon-carbon double bond in a ring, or a C6 to C18 cycloalkynyl group including at least one carbon-carbon triple bond in a ring.

As used herein, the term "(meth)acrylate" refers to acrylate and/or methacrylate.

Herein, the term "hydrocarbyl group" refers to a monovalent group (e.g., an alkyl group, an alkenyl group, an alkynyl group, or an aryl group) that is formed by removal of hydrogen atoms in a hydrocarbon such as alkane, alkene, or alkyl. In the hydrocarbyl group, at least one methylene (—$CH_2$—) moiety may be replaced by an oxide (—O—) moiety.

Herein, the term "visible light" refers to light having a wavelength of about 390 nm to about 700 nm. As used herein, the term "UV" refers to light having a wavelength of about 200 nm to about 400 nm. For example, a high pressure mercury lamp or a metal halide lamp may emit UV light as defined above.

As used herein, the term "quaternary ammonium salt" refers to a salt including a cation of $NR_4^+$ (wherein each R is an alkyl group or an aryl group, and may or may not be linked to each other), and an anion (e.g., halide, sulfate, or phosphonium).

As used herein, the term "silazane" refers to a compound including at least one Si—N bond. The term "polysilazane" may include an oligomeric or polymeric silazane.

As used herein, the term "siloxane" refers to a compound that includes at least one (e.g., alternating) Si—O bond in a linear or cyclic configuration and may have an organic group bonded to the Si atom. The compound may have a branched structure. The term "polysiloxane" refers to an oligomeric and/or polymeric siloxane.

As used herein, the term "siloxazane" refers to a compound that includes at least one (e.g., alternating) Si—O—N bond in a linear or cyclic configuration, and may have an organic group bonded to the Si atom. The compound may have a branched structure. The term "polysiloxazane" refers to an oligomeric and/or polymeric siloxazane.

In an embodiment, the barrier film may include:
a substrate;
a first layer disposed on the substrate and including an oxidation product of a polysilazane; and
a second layer disposed directly on the first layer and including a thiol-ene polymer.

The polysilazane includes a repeating unit represented by Chemical Formula 1.

Chemical Formula 1

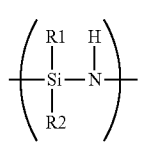

In Chemical Formula 1,
$R^1$ and $R^2$ are each independently hydrogen, an aliphatic hydrocarbon group such as a C1 to C20 alkyl group, a C2 to C20 alkenyl group, and the like, an alicyclic hydrocarbon group such as a C6 to C40 cycloalkyl group and the like, a C1 to C20 alkylsilyl group, a C1 to C20 alkylamino group, a C1 to C20 alkoxy group, or an aromatic hydrocarbon group such as a C6 to C40 aryl group.

The thiol-ene polymer is a polymerization product of a monomer combination including a first monomer having at least two thiol (—SH) groups at its terminal end and a second monomer having at least two carbon-carbon unsaturated bond-containing groups at its terminal end.

The substrate may include: a polymer such as various resins; a metal oxide such as glass, $Al_2O_3$, SiN, SiON, $TiO_2$, $ZrO_2$, ZnO, and the like; a metal (e.g., a metal thin film) including Au, Al, Ag, Pt, Cu, or the like; an organic-inorganic hybrid material such as silsesquioxane; or a combination thereof. For example, the substrate may be transparent. The various resins may include a polymer film including at least one of poly(meth)acrylate, polyester such as polyethylene terephthalate (PET), polybutylene terephthalate (PBT), polyethylene naphthalate (PEN), polyarylate, polycarbonate, polyvinyl chloride, polyethylene, polypropylene, polystyrene, (aliphatic or aromatic) polyamide (e.g., nylon, aramide, and the like), polyether ether ketone, polysulfone, polyether sulfone, polyimide, polyamide imide, polyether imide, a cyclic olefin polymer (COP), and polyvinylidene chloride, but they are not limited thereto.

A first layer including an oxidation product of a polysilazane is formed on one side or both sides of the substrate. The first layer may be formed by applying a coating solution including the polysilazane and carrying out an oxidation reaction.

The polysilazane may include a repeating unit represented by Chemical Formula 1. In Chemical Formula 1, both of $R^1$ and $R^2$ may be hydrogen. For example, the polysilazane may be perhydropolysilazane (PHPS).

The polysilazane may undergo oxidation according to a reaction scheme shown in FIG. 1, in the presence of oxygen or in the presence of oxygen and moisture (water). Therefore, the polysilazane may be a precursor of $SiO_2$, $Si_3N_4$, an intermediate solid solution of the two, $SiO_xN_y$, and the like, wherein x is 0 to 2 and y is 0 to 4/3. The perhydropolysilazane may have a linear structure, a cyclic structure including a 6- and/or 8-membered ring, or a combination thereof. The perhydropolysilazane (e.g., perhydropolysilazane) may be synthesized by any known method or is commercially available. For example, the polysilazane is commercially available in a form of a solution in an organic solvent. In an embodiment, the commercially available product may be used as a polysilazane-containing coating solution as received or diluted with a suitable organic solvent.

A weight average molecular weight of the polysilazane is not particularly limited, and may be, for example, about 600 to about 3,000. A content of the polysilazane in the polysilazane-containing coating solution is not particularly limited, and for example, may be about 0.1 to about 35 percent by mass (mass %), for example, about 0.5 to about 10 mass %, based on the total mass of the coating solution. Within the above ranges of the weight average molecular weight and the content, manufacture of a barrier film may be facilitated, and barrier properties of the barrier film thus prepared may be improved.

A solvent for the polysilazane-containing coating solution may be any suitable solvent other than those that readily react with the polysilazane, for example, an alcohol, water, and the like). A suitable solvent may be, for example, a hydrocarbon solvent such as an aliphatic hydrocarbon, an alicyclic hydrocarbon, an aromatic hydrocarbon, or the like, a halogenated hydrocarbon solvent, or an ether, for example, an aliphatic ether, an alicyclic ether, or the like, or a combination thereof. Examples of the solvent may include, but are not limited to, pentane, hexane, cyclohexane, toluene, xylene, an aromatic solvent (e.g., the ExxonMobil product Solvesso™, and the like), methylene chloride, trichloroethylene, dibutyl ether, dioxane, tetrahydrofuran, and the like, or a combination thereof. These solvents may be selected in light of the solubility of the polysilazane, an evaporation rate of the solvent, or the like. The solvent may be used alone or as a combination of at least two of the foregoing.

Examples of the polysilazane coating solution may include, but are not limited to, Aquamica™ NAX120-20, NN110, NN310, NN320, NL110A, NL120A, NL150A, NP110, NP140, SP140, and the like of the AZ Electronic Materials Company. Among them, NN120 and NN110 include the perhydropolysilazane that does not have a catalyst.

The polysilazane or the coating solution including the same is applied to the substrate and is treated at a predetermined temperature either in the presence of oxygen or in the presence of oxygen and moisture to form the first layer including the oxidation product of the polysilazane. The temperature may be less than or equal to about 200° C., for example, less than or equal to about 195° C., less than or equal to about 190° C., less than or equal to about 185° C., less than or equal to about 180° C., less than or equal to about 175° C., less than or equal to about 170° C., less than or equal to about 165° C., less than or equal to about 160° C., less than or equal to about 155° C., or even less than or equal to about 150° C. The temperature may be greater than or equal to about 20° C., greater than or equal to about 25° C., greater than or equal to about 30° C., greater than or equal to about 35° C., greater than or equal to about 40° C., greater than or equal to about 45° C., greater than or equal to about 50° C., greater than or equal to about 55° C., greater than or equal to about 60° C., greater than or equal to about 65° C., greater than or equal to about 70° C., greater than or equal to about 75° C., greater than or equal to about 80° C., greater than or equal to about 85° C., greater than or equal to about 90° C., or greater than or equal to about 95° C.

The treating of the polysilazane may include keeping the polysilazane in the aforementioned atmosphere at a temperature within the aforementioned range. The treating of the polysilazane may include irradiating the polysilazane including the repeating unit of Chemical Formula 1 with UV light. The intensity and the source types of the UV light are not particularly limited and may be selected appropriately. The treating of the polysilazane may include irradiating the polysilazane including the repeating unit of Chemical Formula 1 with UV light having a wavelength of about 200 nanometers (nm) or higher. In an embodiment, the treating of the polysilazane may be carried out without irradiation of vacuum UV having a wavelength of less than about 200 nm.

The oxidation reaction (i.e., the aforementioned treating) of the polysilazane may be carried out in the presence of at least one catalyst selected from an amine compound, a platinum (Pt) compound such as platinum acetylacetonate (e.g., platinum carbonate), a palladium compound such as palladium acetylacetonate (e.g., palladium carbonate), a rhodium compound such as rhodium acetylacetonate (e.g., rhodium carbonate), and a combination thereof. The amine compound may include a tertiary amine. For example, the tertiary amine may include a compound having three lower alkyl chains of five or less carbon atoms such as triethylamine, trimethyl amine, diethylpropyl amine, N-ethyldiisopropyl amine, but it is not limited thereto. For example, the tertiary amine may be a compound having a plurality of amine groups in a single molecule. Examples of such a compound may include, but are not limited to, N,N,N',N'-tetramethyl diaminomethane and N,N,N',N'-tetramethyl ethylene diamine. The tertiary amine may have a ring structure. For example, the tertiary amine may include, but is not limited to, 1-ethyl pyrrolidine, 2,6-lutidine, 4-methyl morpholine, and 1-ethyl piperidine. Further examples of the amine compound may include, but are not limited to, N,N-diethylethanol amine, N,N-dimethylethanol amine, triethanol amine, triethylamine, 3-morpholino propyl amine, N,N,N',N'-tetramethyl-1,3-diamino propane, and N,N,N',N'-tetramethyl-1.6-diamino hexane. In an embodiment, the catalyst may include N,N-diethylethanol amine, N,N,N',N'-tetramethyl ethylene diamine, or a combination thereof.

The catalyst may be used in an amount of greater than or equal to about 0.1 parts by weight, for example, greater than or equal to about 0.5 parts by weight per 100 parts by weight of the polysilazane, but it is not limited thereto. The catalyst may be used in an amount of less than or equal to about 20 parts by weight, for example, less than or equal to about 10 parts by weight per 100 parts by weight of the polysilazane, but it is not limited thereto. The amount of the catalyst may be adjusted in order to control the oxidation reaction rate, and this makes it possible to avoid: rapid progress of the reaction, the formation of an excess amount of silanol, a decrease in a density of an oxidation product film, the occurrence of defects, and the like.

The oxidation product may include a silicon oxide, a silicon oxynitride, a polysiloxane, a polysiloxazane, or a combination thereof depending on the types of the polysilazane having a repeating unit represented by Chemical Formula 1. In some embodiments, when the oxidation product of the polysilazane is subjected to an FT-IR spectroscopic analysis, the ratio of the Si—O moiety with respect to the Si—H moiety (Si—O/Si—H) may be greater than or equal to about 0.1 and less than or equal to about 15. In some embodiments, when the oxidation product of the polysilazane is subjected to a FT-IR spectroscopic analysis, the ratio of the Si—O moiety with respect to the Si—H moiety (Si—O/Si—H) may be greater than or equal to about 2 and less than or equal to about 13. In the FT-IR analysis, the ratio of the Si—O moiety with respect to the Si—H moiety (Si—O/Si—H) may represent the oxidation degree of the polysilazane. As the catalysis (i.e., the conversion of the polysilazane into silica) progresses, the absorption peak for the Si—O moiety at a wavenumber of 1030 $cm^{-1}$ and 450 $cm^{-1}$ increases while the absorption peak for the N—H moiety at a wavenumber of 3350 $cm^{-1}$ and 1200 $cm^{-1}$ and the absorption peak for Si—H at a wavenumber of 2200 $cm^{-1}$ decreases.

As mentioned above, the polysilazane may be oxidized in the presence of oxygen or in the presence of oxygen and moisture (i.e., water) in accordance with a reaction scheme shown in FIG. 1. During such an oxidation reaction, the oxygen and/or water may facilitate direct substitution of nitrogen with oxygen, and thereby the polysilazane may be converted into a silicon oxide with a relatively small degree of volume shrinkage so that the reaction may result in a relatively dense film having a reduced number of defects caused by the volume shrinkage. In addition, when the polysilazane is treated, controlling the composition the oxidative atmosphere makes it possible to form a relatively dense film.

However, a high temperature (e.g., of greater than or equal to about 450° C.) is necessary in order to form such a dense film, since the oxidation product formed at a low temperature cannot form a dense film, which may show a significantly low level of barrier properties. In order to address such a problem, there has been an attempt to form a film of the oxidation product of the polysilazane by using vacuum UV (e.g., having a wavelength of less than or equal to about 200 nm or having a wavelength of about 100 nm to about 200 nm, hereinafter, referred to as VUV), for example, by using an Excimer laser, that has a higher energy than the bonding force of each atom of the polysilazane. In this attempt, the VUV is used to break the single bond of the polysilazane and the oxidation reaction is carried out by active oxygen or ozone, which makes it possible to form an oxidation product film at a relatively lower temperature. However, the irradiation of the VUV entails expensive special equipment and the resulting film prepared by using the VUV does not show sufficiently enhanced barrier properties.

In contrast, according to an embodiment, the barrier film includes a second layer disposed directly on the first layer and including a thiol-ene polymer, and thereby addresses the aforementioned problems. In some embodiments, the barrier films may exhibit an enhanced level of barrier properties even when the first layer is formed under various conditions (e.g., without using the VUV and/or at a relatively low temperature, for example, of less than or equal to about 200° C.). In other words, when the polysilazane is oxidized without using the VUV under a relatively mild condition, the resulting oxidation product of the polysilazane may have a ratio of the Si—O moiety with respect to the Si—H moiety that is within the aforementioned range. While not wishing to be bound by a theory, it is understood that when the first layer includes the oxidation product of the polysilazane having the ratio of the Si—O moiety with respect to the Si—H moiety within the aforementioned range, the barrier film having the aforementioned first layer may show enhanced barrier properties as it is combined with the second layer including the thiol-ene polymer. In the barrier film of the embodiments, the thicknesses of the first layer and the second layer may be selected in light of crack occurrence, light transmittance, and the like. For example, the thickness of the first layer may be greater than or equal to about 50 nm and less than or equal to about 2 micrometers (um). In addition, the thickness of the second layer may be greater than or equal to about 5 um and less than or equal to about 300 um.

In accordance with some embodiments, the barrier film may exhibit improved resistance against the transmission of oxygen and water. For example, an oxygen transmission rate (OTR) of the barrier film may be less than or equal to about 10 grams per square meter per day per atmosphere (gram/m²/day/atm) as measured with Oxytran (manufactured by Mocon Inc.) equipment according to ASTM D 3985 or JIS K 7128-2 at a temperature of 23° C. and a relative humidity (RH) of 0%. For example, water vapor transmission rate (WVTR) of the barrier film may be less than or equal to about 10 grams per meter per day (gram/m²/day) as measured with Aquatran (manufactured by Mocon, Inc.) equipment according to JIS K7129B at a temperature of 37° C. and a relative humidity (RH) of 100%.

Figure 3:
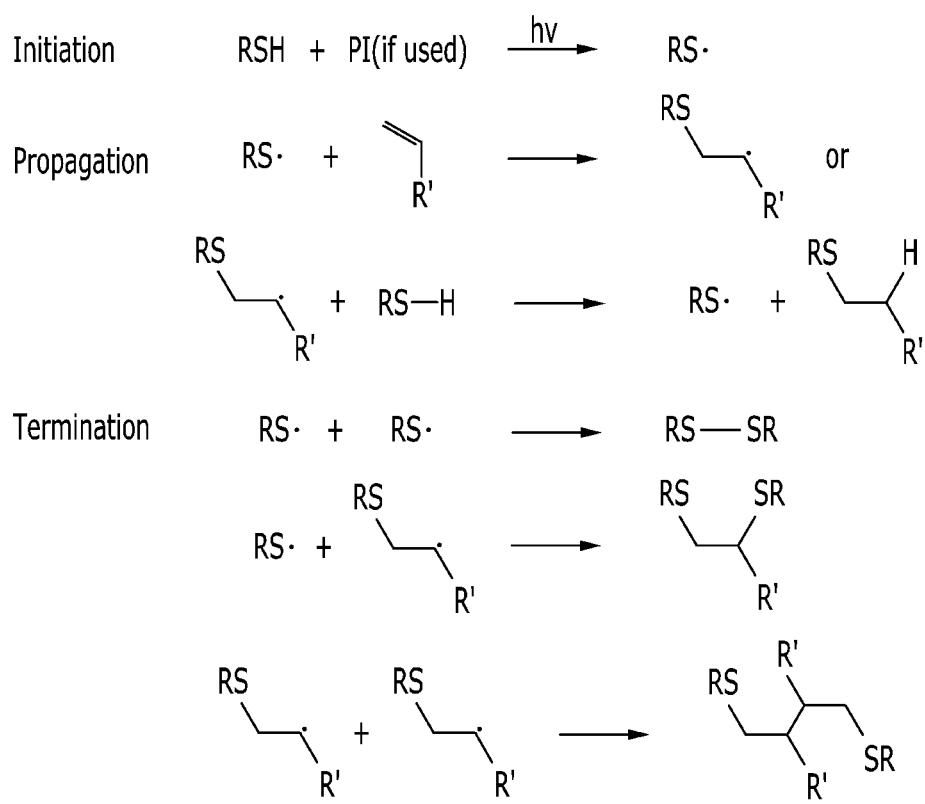
FIG. 3 illustrates an exemplary polymerization scheme of the formation of a thiol-ene polymer.

The thiol-ene polymer is a polymerization product of a monomer combination including a first monomer having at least two thiol (—SH) groups at its terminal end and a second monomer having at least two carbon-carbon unsaturated bond-containing groups at its terminal end. The monomer combination is applied to the first layer including the oxidation product of the polysilazane, the polymerization is initiated (for example, by using light irradiation such as UV irradiation), and propagation is made to form the second layer on the first layer, producing a barrier film according to some embodiments. The first monomer and the second monomer may form a highly cross-linked polymer through a polymerization mechanism as shown in FIG. 3. Referring to FIG. 3, a thiyl radical may be formed from a thiol group by an initiation reaction using light and an initiator as needed. The thiyl radical thus formed may react with a carbon-carbon unsaturated bond, and then may realize a propagation reaction by a vinyl radical obtained therefrom that may react with the thiol or carbon-carbon unsaturated bond. The polymerization may be terminated by combination of the formed thiyl radical and thiyl radical, of the vinyl radical and the vinyl radical, or of the thiyl radical and the vinyl radical. In the monomer combination, since the first monomer includes two or more thiol groups (e.g., 3 thiol groups or 4 thiol groups) and the second monomer includes two or more unsaturated bonds, the polymer prepared from the monomer combination may have a highly densified cross-linking structure.

The first monomer may be represented by Chemical Formula 2.

Chemical Formula 2

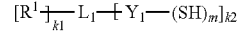

In Chemical Formula 2, $R^1$ is selected from hydrogen; a substituted or unsubstituted C1 to C30 linear or branched alkyl group; a substituted or unsubstituted C6 to C30 aryl group; a substituted or unsubstituted C3 to C30 heteroaryl group; a substituted or unsubstituted C3 to C30 cycloalkyl group; a substituted or unsubstituted C3 to C30 heterocycloalkyl group; a C1 to C10 alkoxy group; a hydroxy group; —NH$_2$; a substituted or unsubstituted C1 to C30 amine group (—NRR', wherein R and R' are independently hydrogen or a C1 to C30 linear or branched alkyl group); an isocyanate group; a halogen; —ROR' (wherein R is a substituted or unsubstituted C1 to C20 alkylene group and R' is hydrogen or a C1 to C20 linear or branched alkyl group); an acyl halide (—RC(=O)X, wherein R is a substituted or unsubstituted alkylene group and X is a halogen); —C(=O)OR' (wherein R' is hydrogen or a C1 to C20 linear or branched alkyl group); —CN; or —C(=O)ONRR' (wherein R and R' are independently hydrogen or a C1 to C20 linear or branched alkyl group), L$_1$ is a carbon atom, a substituted or unsubstituted C1 to C30 alkylene group, a substituted or unsubstituted C6 to C30 cycloalkylene group, a substituted or unsubstituted C6 to C30 arylene group, or a substituted or unsubstituted C6 to C30 heteroarylene group, wherein at least one of methylene (—CH$_2$—) groups of the substituted C1 to C30 alkylene group may be replaced by sulfonyl (—SO$_2$—), carbonyl (CO), ether (—O—), sulfide (—S—), sulfoxide (—SO—), ester (—C(=O)O—), amide (—C(=O)NR—) (wherein R is hydrogen or a C1 to C10 alkyl group), or a combination thereof, Y$_1$ is a single bond; a substituted or unsubstituted C1 to C30 alkylene group; a substituted or unsubstituted C2 to C30 alkenylene group; or a C1 to C30 alkylene group or a C2 to C30 alkenylene group wherein at least one of methylene (—CH$_2$—) groups is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—NR—) (wherein R is hydrogen or a C1 to C10 linear or branched alkyl group), or a combination thereof, m is an integer of 1 or more, k1 is an integer of 1 or more and k2 is an integer of 1 or more, and the sum of m and k2 is an integer of 3 or more, provided that when Y$_1$ is not a single bond, m does not exceed the valence of Y$_1$, and provided that the sum of k1 and k2 does not exceed the valence of L$_1$.

The first monomer of the Chemical Formula 2 may include a monomer of the following Chemical Formula 2-1.

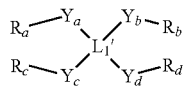

Chemical Formula 2-1

In Chemical Formula 2-1,

L$_1$' is carbon, a substituted or unsubstituted C6 to C30 arylene group; a substituted or unsubstituted C3 to C30 heteroarylene group; a substituted or unsubstituted C3 to C30 cycloalkylene group; or a substituted or unsubstituted C3 to C30 heterocycloalkylene group, Y$_a$ to Y$_d$ are each independently a single bond; a substituted or unsubstituted C1 to C30 alkylene group; a substituted or unsubstituted C2 to C30 alkenylene group; or a C1 to C30 alkylene group or a C2 to C30 alkenylene group wherein at least one of methylene (—CH$_2$—) groups is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—NR—) (wherein R is hydrogen or a C1 to C10 linear or branched alkyl group), or a combination thereof, and R$_a$ to R$_d$ are R$^1$ or SH of Chemical Formula 2, provided that at least two of R$_a$ to R$_d$ are SH.

For example, the first monomer of the Chemical Formula 2 may be trimethylolpropane tris(3-mercaptopropionate) of the following Chemical Formula 2-2, pentaerythritol tetrakis(3-mercaptopropionate) of the following Chemical Formula 2-3, pentaerythritol tetrakis(2-mercaptoacetate of Chemical Formula 1-4, tris[2-(3-mercaptopropionyloxy)alkyl] isocyanurate of the following Chemical Formula 1-5, pentaerythritol tetrakis(3-mercaptobutyrate), trimethylolpropane tris(3-mercaptopropionate) (3T), tris[2-(3-mercaptopropionyloxy)ethyl]isocyanurate (3TI), a compound of the following Chemical Formula 2-6, a compound of the following Chemical Formula 2-7, a compound of the following Chemical Formula 2-8, or a combination thereof, but is not limited thereto.

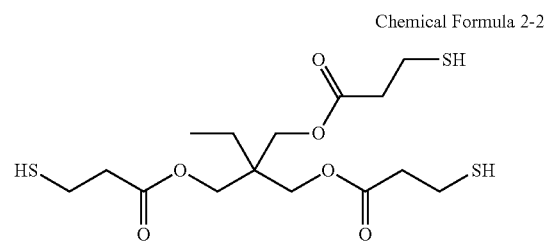

Chemical Formula 2-2

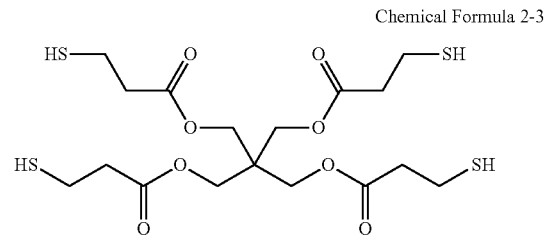

Chemical Formula 2-3

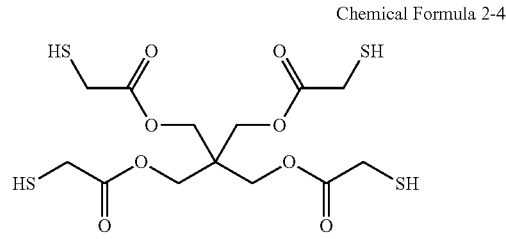

Chemical Formula 2-4

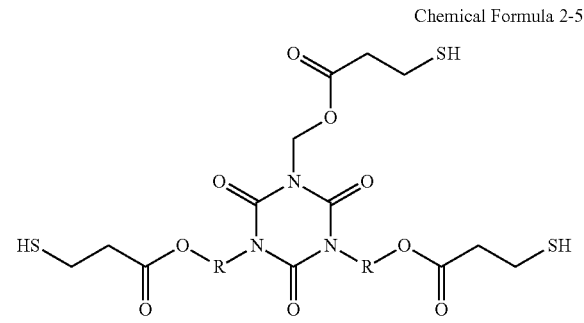

Chemical Formula 2-5

In Chemical Formula 2-5, R is a substituted or unsubstituted C1 to C10 alkylene.

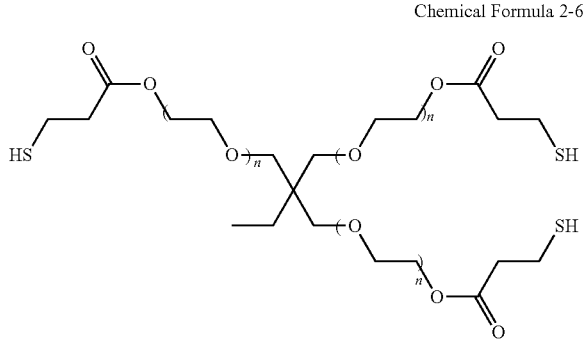

Chemical Formula 2-6

Herein, n is an integer ranging from 1 to 20.

Chemical Formula 2-7

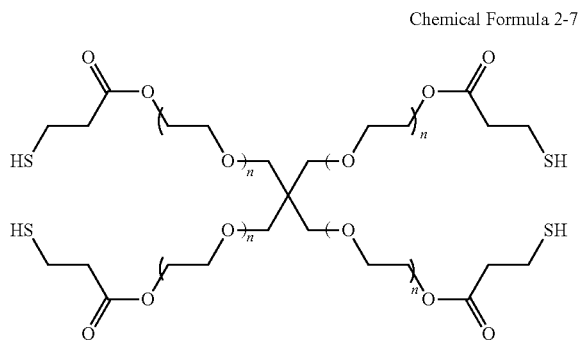

Herein, n is an integer ranging from 1 to 20.

Chemical Formula 2-8

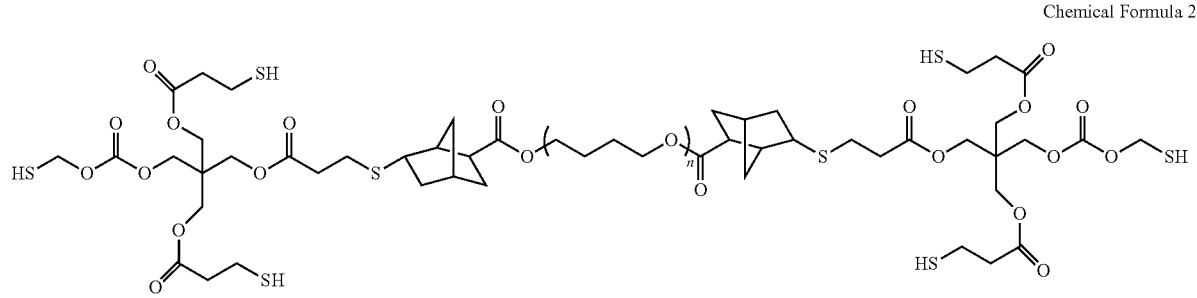

Herein, n is an integer ranging from 1 to 20.

The compounds of Chemical Formula 2-2 to Chemical Formula 2-8 may be commercially available from, for example, Sartomer, or may be synthesized by a known method.

The second monomer may be represented by the following Chemical Formula 3.

Chemical Formula 3

In Chemical Formula 3,

X is an aliphatic organic group including a carbon-carbon double bond or a carbon-carbon triple bond, an aromatic organic group including a carbon-carbon double bond or a carbon-carbon triple bond, or an alicyclic organic group including a carbon-carbon double bond or a carbon-carbon triple bond, $R^2$ is selected from hydrogen; a substituted or unsubstituted C1 to C30 linear or branched alkyl group; a substituted or unsubstituted C6 to C30 aryl group; a substituted or unsubstituted C3 to C30 heteroaryl group; a substituted or unsubstituted C3 to C30 cycloalkyl group; a substituted or unsubstituted C3 to C30 heterocycloalkyl group; a C1 to C10 alkoxy group; a hydroxy group; $NH_2$; a substituted or unsubstituted C1 to C30 amine group (—NRR', wherein R and R' are independently hydrogen or a C1 to C30 linear or branched alkyl group); an isocyanate group; a halogen; —ROR' (wherein R is a substituted or unsubstituted C1 to C20 alkylene group and R' is hydrogen or a C1 to C20 linear or branched alkyl group); an acyl halide (—RC(=O)X, wherein R is a substituted or unsubstituted alkylene group and X is a halogen); —C(=O)OR' (wherein R' is hydrogen or a C1 to C20 linear or branched alkyl group); —CN; or —C(=O)ONRR' (wherein R and R' are independently hydrogen or a C1 to C20 linear or branched alkyl group), $L_2$ is a carbon atom, a substituted or unsubstituted C1 to C30 alkylene group, a substituted or unsubstituted C6 to C30 cycloalkylene group, a substituted or unsubstituted C6 to C30 arylene group, or a substituted or unsubstituted C3 to C30 heteroarylene group, $Y_2$ is a single bond; a substituted or unsubstituted C1 to C30 alkylene group; a substituted or unsubstituted C2 to C30 alkenylene group; or a C1 to C30 alkylene group or a C2 to C30 alkenylene group wherein at least one of methylene (—$CH_2$—) groups is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—NR—) (wherein R is hydrogen or a C1 to C10 linear or branched alkyl group), or a combination thereof, n is an integer of 1 or more, k3 is an integer of 0 or more, k4 is an integer of 1 or more, and the sum of n and k4 is an integer of 3 or more, provided that when the $Y_2$ is not a single bond, n does not exceed the valence of $Y_2$, and provided that the sum of k3 and k4 does not exceed the valence of $L_2$.

In an embodiment, in Chemical Formula 3, X may be selected from an acrylate group; a methacrylate group; a C2 to C30 alkenyl group; a C2 to C30 alkynyl group; a substituted or unsubstituted C3 to C30 alicyclic organic group including a carbon-carbon double bond or a carbon-carbon triple bond in a ring; a substituted or unsubstituted C3 to C30 heterocycloalkyl group including a carbon-carbon double bond or a carbon-carbon triple bond in a ring; a C3 to C30 alicyclic organic group substituted with a C2 to C30 alkenyl group or a C2 to C30 alkynyl group; or a C3 to C30 heterocycloalkyl group substituted with a C2 to C30 alkenyl group or a C2 to C30 alkynyl group.

In Chemical Formula 3, $L^2$ may include a linear or branched C1 to C30 alkylene moiety, a tricyclodecane moiety, a pyrrolidine moiety, a tetrahydrofuran moiety, a pyridine moiety, a pyrimidine moiety, a piperidine moiety, a triazine moiety, or an isocyanurate moiety.

The substituted or unsubstituted C3 to C30 alicyclic organic group including a carbon-carbon double bond or a carbon-carbon triple bond in a ring may be selected from a norbornene group, a maleimide group, a nadimide group, a tetrahydrophthalimide group, or a combination thereof.

In an embodiment, the second monomer may be a C4 to C100 diallyl compound such as 1,3-butadiene or diallyl succinate, a C7 to C100 triallyl compound such as triallyl borate, 2,4,6-triallyloxy-1,3,5-triazine, or 1,3,5-triallyl-1,3,5-triazine-2,4,6(1H,3H,5H)-trione, a C6 to C100 diallyl ether compound such as allyl ether, trimethylolpropane diallyl ether, or 2,2'-diallyl bisphenol A diacetate ether, a C10 to C100 triallyl ether compound such as 1-(allyloxy)-2,2-bis((allyloxy)methyl)butane, a C4 to C100 di(meth)acrylate compound such as ethylene glycol dimethacrylate, hexanediol diacrylate, or tricyclodecane dimethanol diacrylate, a C9 to C100 tri(meth)acrylate compound such as trimethylolpropane triacrylate or ethoxylated trimethylolpropane triacrylate, a divinyl ether compound such as triethylene glycol divinyl ether, bis[4-vinyloxy)butyl]adipate, or 1,4-butanediol divinyl ether, or a combination thereof.

The second monomer of the Chemical Formula 3 may be represented by Chemical Formula 3-1, Chemical Formula 3-2, Chemical Formula 3-3, or Chemical Formula 3-4.

Chemical Formula 3-1

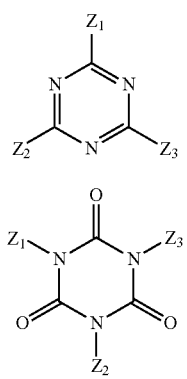

Chemical Formula 3-2

In Chemical Formulae 3-1 and 3-2, $Z_1$ to $Z_3$ are each independently *—$Y_2$—$X_n$ as defined for the Chemical Formula 3.

Chemical Formula 3-3

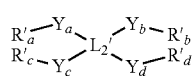

In Chemical Formula 3-3, $L_2'$ is carbon; a substituted or unsubstituted C1 to C30 alkylene group; a substituted or unsubstituted C2 to C30 alkenylene group; a C1 to C30 alkylene group wherein at least one of methylene (—$CH_2$—) groups is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—NR—) (wherein R is hydrogen or a C1 to C10 linear or branched alkyl group), a C6 to C10 cycloalkylene group, or a combination thereof; a C2 to C30 alkenylene group wherein at least one of methylene (—$CH_2$—) groups is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—NR—) (wherein R is hydrogen or a C1 to C10 linear or branched alkyl group), a C6 to C10 cycloalkylene group, or a combination thereof; a substituted or unsubstituted C6 to C30 arylene group; a substituted or unsubstituted C3 to C30 heteroarylene group; a substituted or unsubstituted C3 to C30 cycloalkylene group; or a substituted or unsubstituted C3 to C30 heterocycloalkylene group, $Y_a$ to $Y_d$ are each independently a single bond; a substituted or unsubstituted C1 to C30 alkylene group; a substituted or unsubstituted C2 to C30 alkenylene group; or a C1 to C30 alkylene group or a C2 to C30 alkenylene group wherein at least one of methylene (—$CH_2$—) groups is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—NR—) (wherein R is hydrogen or a C1 to C10 linear or branched alkyl group), or a combination thereof, and $R'_a$ to $R'_d$ are $R^2$ or X of Chemical Formula 3, provided that at least two of $R'_a$ to $R'_d$ is X of Chemical Formula 3.

In an embodiment, the second monomer may include a compound of the following Chemical Formula 3-4, a compound of Chemical Formula 3-5, a compound of Chemical Formula 3-6, a compound of Chemical Formula 3-7, a compound of the following Chemical Formula 3-8, a compound of Chemical Formula 3-9, a compound of Chemical Formula 3-10, a compound of Chemical Formula 3-11, a compound of the following Chemical Formula 3-12, a compound of Chemical Formula 3-13, a compound of Chemical Formula 3-14, a compound of Chemical Formula 3-15, or a combination thereof.

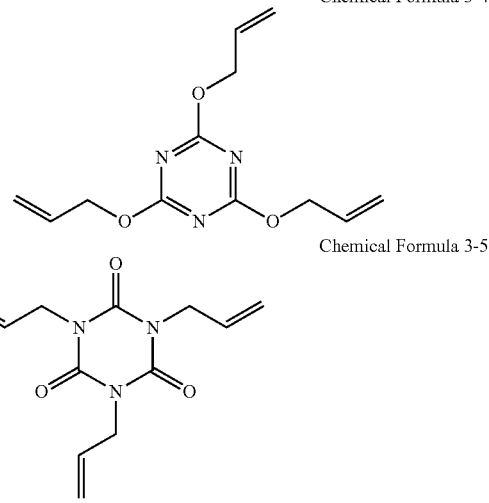

Chemical Formula 3-4

Chemical Formula 3-5

Chemical Formula 3-6

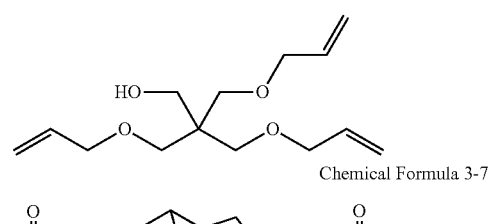

Chemical Formula 3-7

In Chemical Formula 3-7, $R_1$ is a C1 to C20 alkylene group, or a C1 to C20 alkylene group wherein at least one methylene (—$CH_2$—) group is replaced by sulfonyl (—S(=O)$_2$—), carbonyl (—C (=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—NR—) (wherein R is hydrogen or a C1 to C10 linear or branched alkyl group), or a combination thereof, and R$_2$ is hydrogen or a methyl group.

Chemical Formula 3-8

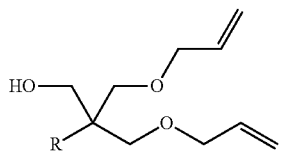

In Chemical Formula 3-8, R is a C1 to C10 alkyl group.

Chemical Formula 3-9

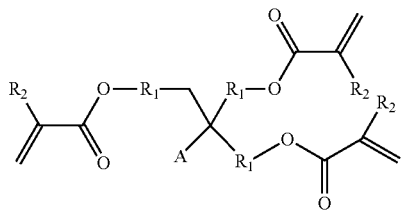

In Chemical Formula 3-9,

A is a C1 to C10 alkyl group or a hydroxy group,

R$_1$ is a single bond, a C1 to C20 alkylene group, a C1 to C20 alkylene wherein at least one methylene (—CH$_2$—) group is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—NR—) (wherein R is hydrogen or a C1 to C10 linear or branched alkyl group), or a combination thereof, and R$_2$ is hydrogen or a methyl group.

Chemical Formula 3-10

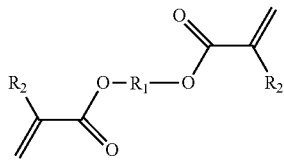

In Chemical Formula 3-10,

R$_1$ is a single bond, a C1 to C20 alkylene, or C1 to C20 alkylene wherein at least one methylene (—CH$_2$—) group is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—NR—) (wherein R is hydrogen or a C1 to C10 linear or branched alkyl group), or a combination thereof, and R$_2$ is hydrogen or a methyl group.

Chemical Formula 3-11

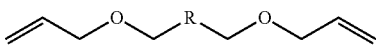

In Chemical Formula 3-11, R is a single bond, a C1 to C20 alkylene, or C1 to C20 alkylene wherein at least one methylene (—CH$_2$—) group is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—NR—) (wherein R is hydrogen or a C1 to C10 linear or branched alkyl group), or a combination thereof.

Chemical Formula 3-12

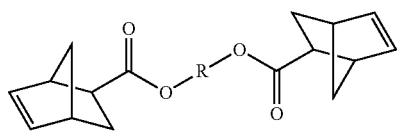

In Chemical Formula 3-12, R is a C1 to C20 alkylene, or a C1 to C20 alkylene wherein at least one methylene (—CH$_2$—) group is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—NR—) (wherein R is hydrogen or a C1 to C10 linear or branched alkyl group), or a combination thereof.

Chemical Formula 3-13

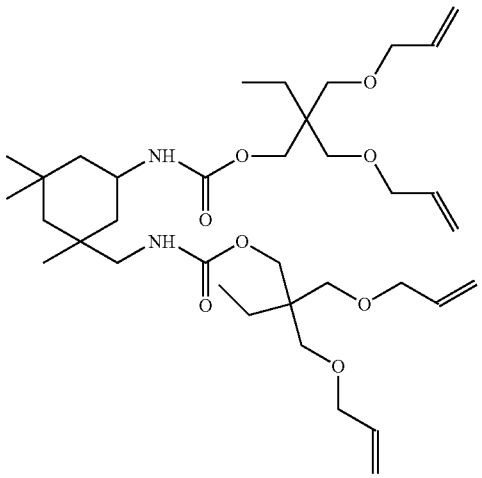

Chemical Formula 3-14

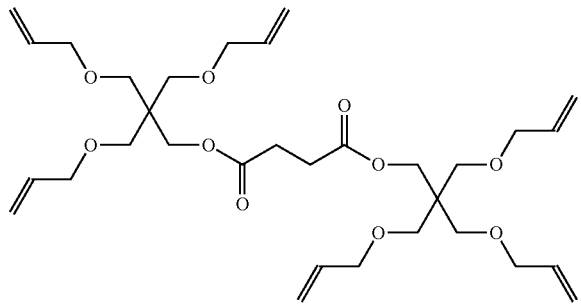

Chemical Formula 3-15

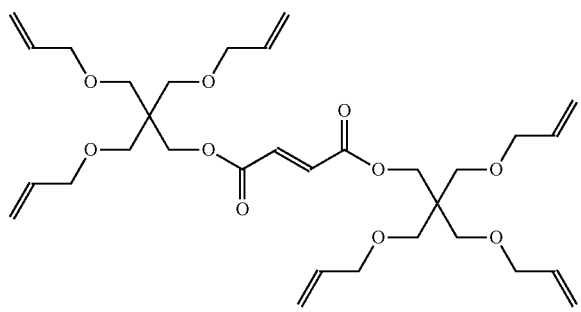

In the monomer combination (which can be a mixture), the amounts of the first monomer and the second monomer may be adjusted in order to obtain desirable properties. For example, in the monomer combination, the first monomer and the second monomer may be present so that a mole ratio of the thiol group of the first monomer and the carbon-carbon unsaturated bond of the second monomer may be about 1:0.1 to about 1:10, for example, about 1:about 0.2 to 1:5, about 1:about 0.75 to 1:3, about 1:about 1.1 to 2, or about 1:about 1.5 to 1.8. When the monomer combination includes the first and second monomers within the above ranges, a polymer composite manufactured therefrom may have a high density network and thus excellent mechanical strength and properties.

The composition for the light emitting particle-polymer composite may further include a third monomer having one thiol group located at a terminal end of the third monomer, a fourth monomer having one unsaturated carbon-carbon bond located at a terminal end of the fourth monomer, or both of them. The third monomer may be a compound in which each of m and k2 is 1 in Chemical Formula 2, and the fourth monomer may be a compound in which each of n and k4 is 1 in Chemical Formula 3.

Examples of the third monomer may be a C1 to C20 alkyl 3-mercaptopropionate, alkyl thioglycolate, a C1 to C20 thiol-substituted (meth)acrylate, a C1 to C20 thiol-substituted silane, for example (3-mercaptopropyl)trimethoxysilane, but are not limited thereto.

Examples of the fourth monomer may be (meth)acrylates such as isobornyl (meth)acrylate, isooctyl (meth)acrylate, lauryl (meth)acrylate, benzoyl (meth)acrylate, norbornyl (meth)acrylate, cyclohexyl (meth)acrylate, n-hexyl (meth)acrylate, isooctyl (meth)acrylate, butyl (meth)acrylate, adamantyl acrylate, and cyclopentyl acrylate, vinyl ether, alkyl ether, propenyl ether, alkenes or alkynes such as pentene, hexane, and hexyne, unsaturated ester, maleimide, acrylonitrile, styrene, diene, N-vinyl amide, and the like, but are not limited thereto.

The amounts of the third monomer and the fourth monomer are not particularly limited, and may be appropriately selected considering miscibility, viscosity, releasing properties, and optical properties. For example, the third monomer such as (3-mercaptopropyl)trimethoxysilane and the like may be used in an amount of less than or equal to about 30 parts by weight, for example less than or equal to about 20 parts by weight, less than or equal to about 15 parts by weight, or less than or equal to about 10 parts by weight based on 100 parts by weight of the monomer combination, and the fourth monomer such as the lauryl methacrylate monomer may be used in an amount of less than or equal to about 30 parts by weight, for example less than or equal to about 20 parts by weight, less than or equal to about 15 parts by weight, less than or equal to about 12 parts by weight, or less than or equal to about 10 parts by weight, without limitation. While not wishing to be bound by a theory, it is understood that within the ranges, a composite manufacturing process may be smoothly carried out while ensuring mechanical properties of the composite.

The monomer combination may further include an initiator so as to promote a polymerization initiation reaction. The initiator may be a phosphine oxide compound, an α-amino ketone, phenyl glyoxylate, monoacyl phosphine, benzylmethyl ketal, hydroxyketone, azobisisobutyronitrile, benzoyl peroxide, and the like.

In an embodiment, the second layer may further include a plurality of clay particles dispersed in the thiol-ene polymer. The clay particle may include a clay particle having a surface modified with an organic compound (i.e., an organo-modified clay particle). As used herein, the term "organo-modified" refers to treatment of a raw material of clay with an organic compound to provide the clay having the organic compound attached to it. The clay particle may include synthetic clay. The organo-modified clay particles may include, for example, an organic compound having a hydrocarbyl group linked to a heteroatom selected from nitrogen (N), sulfur (S), and phosphorus (P) on the surface. The organic compound may be selected from a tertiary amine, a quaternary ammonium salt, a tertiary phosphine, a quaternary phosphonium salt, a thiol including an amine group, or a combination thereof. The compound may include hexylamine, a dioctadecyldimethylammonium salt, a methyltrioctylammonium salt, a hexyltriphenylphosphonium salt, a tributylmethylphosphonium salt, a triethylpentylphosphonium salt, 8-amino-1-octanethiol, trioctylphosphonium, tetraphenylphosphonium, a dioctadecyldimethylammonium salt, a methyltrioctylammonium salt, a hexyltriphenylphosphonium salt, a triethylpentylphosphonium salt, 8-amino-1-octanethiol, or a combination thereof.

The organo-modified clay particles may be commercially available or manufactured by a known method. For example, the organo-modified clay particles may be obtained by dispersing clay intrinsically having a hydrophilic surface in a predetermined amount of water, adding the aforementioned organic compound thereto, and then agitating the same for a predetermined time followed by filtering. The organo-modified clay particles may be readily dispersed in the thiol-ene monomer combination or the thiol-ene polymer, and may increase the haze of the final polymer without a negative effect on light transmittance of the composite.

The clay particles dispersed in the combination of the first monomer and the second monomer may be included in an amount of greater than or equal to about 0.1 parts by weight, for example, greater than or equal to about 0.5 parts by weight, greater than or equal to about 1 part by weight, greater than or equal to about 2 parts by weight, or greater than or equal to about 3 parts by weight based on 100 parts by weight of the monomer combination. The clay particles may be included in an amount of less than or equal to about 20 parts by weight, for example, in an amount of less than or equal to about 19 parts by weight, less than or equal to about 18 parts by weight, less than or equal to about 17 parts by weight, less than or equal to about 16 parts by weight, less than or equal to about 15 parts by weight, less than or equal to about 14 parts by weight, less than or equal to about 13 parts by weight, less than or equal to about 12 parts by weight, or less than or equal to about 10 parts by weight based on 100 parts by weight of the monomer combination. In an embodiment, the amount of the clay particle may be within a range of about 0.1 percent by weight (wt %) to about 20 wt %, e.g., about 1 wt % to about 15 wt %, based on the total weight of the clay-thiolene polymer composite. While not wishing to be bound by a theory, it is understood that when the clay particles are included in an amount of the aforementioned range, a transmission rate of oxygen and water (i.e., moisture) may be maintained at a low level and light transmittance of the prepared polymer may be maintained at a high level.

The clay particles may include smectite clay, mica clay, vermiculite clay, montmorillonite clay, iron-containing montmorillonite clay, beidellite clay, saponite clay, hectorite clay, stibensite clay, nontronite clay, anionic clay (e.g., layered double hydroxide or hydrotalcite), zirconium phosphate, kaolinite, atapulgite, illite, halloysite, diatomaceous earth, fuller's earth, calcined aluminum silicate, hydrated aluminum silicate, magnesium aluminum silicate, sodium silicate, magnesium silicate, or a combination thereof. In an embodiment, the clay particles may be smectite clay. The clay particles may be sheet-shaped particles having a nano-sized thickness. The clay particles may have an aspect ratio ranging from about 20 to about 10,000 in an exfoliated form. Herein, the aspect ratio indicates a ratio of a longest diameter of a clay particle (a single clay sheet) relative to a thickness thereof. In an embodiment, the clay particles may have the longest average diameter of about 50 nm to about 10 um, for example, about 50 nm to about 1 um, and an average thickness of about 1 nm to about 10 nm. The clay particles may have a layered structure including at least one sheet.

The clay particles include the aforementioned compound including a hydrocarbyl group linked to a heteroatom and thus may be lipophilic (or hydrophobic). The clay particles may be dispersed in a post-described monomer combination or a cross-linked polymer manufactured therefrom without substantial phase-separation or aggregation. The clay particles may be dispersed in a post-described monomer combination or a cross-linked polymer manufactured therefrom without substantial interlayer exfoliation. As a result, a barrier coating composition including the clay particles or a clay-polymer composite prepared therefrom may show high transmittance regarding visible light. For example, the barrier coating composition including the clay particles (and the clay-polymer composite prepared therefrom) may have light transmittance of greater than or equal to about 85%, for example, greater than or equal to about 90% for visible light.

The aforementioned barrier film shows excellent gas/moisture blocking properties together with high light transmission and thus may find its use in a barrier layer of a quantum dot-polymer matrix. Accordingly, in another embodiment, a quantum dot-polymer composite article includes:

a quantum dot-polymer composite that includes a polymer host matrix and a plurality of quantum dots dispersed in the polymer host, and a barrier film disposed on at least a portion of the surface of the quantum dot polymer composite.

The barrier film includes:

a substrate;

a first layer disposed on the substrate and including an oxidation product of polysilazane, wherein the polysilazane includes a repeating unit represented by Chemical Formula 1

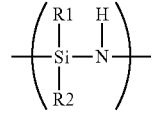

Chemical Formula 1 wherein $R^1$ and $R^2$ are each independently hydrogen, an aliphatic hydrocarbon group, an alicyclic hydrocarbon group, an alkylsilyl group, an alkylamino group, an alkoxy group, or an aromatic hydrocarbon group; and a second layer disposed directly on the first layer and including a thiol-ene polymer, and wherein the thiol-ene polymer is a polymerization product of a monomer combination including a first monomer having at least two thiol (—SH) groups at its terminal end and a second monomer having at least two carbon-carbon unsaturated bond-containing groups at its terminal end, and wherein the barrier film is disposed in such a manner that a surface of the second layer faces at least a portion of a surface of the quantum dot-polymer matrix.

Figure 4:
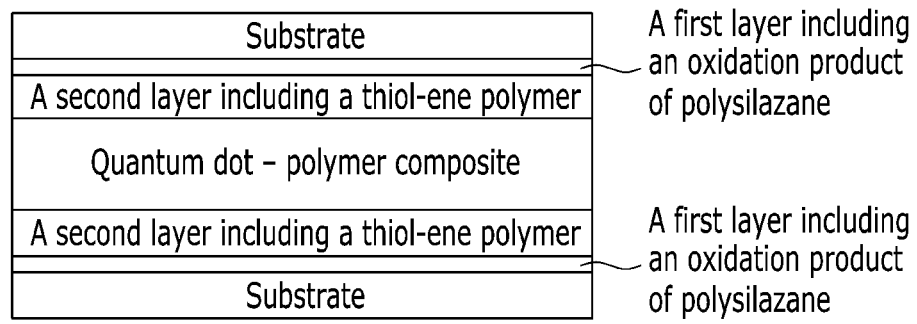
FIG. 4 schematically shows a cross-sectional view of a quantum dot-polymer composite article in accordance with an embodiment.

The quantum dot-polymer matrix composite may include a barrier film on one or both of the surfaces of the composite. FIG. 4 schematically shows the cross-sectional view of a quantum dot-polymer composite article according to a non-limiting embodiment. Referring to FIG. 4, the barrier film is provided on both sides of a quantum dot polymer composite. Alternatively, the barrier film may be provided on one side of the quantum dot polymer composite. The barrier film may be disposed with the surface of the second layer facing (e.g., contacting) the surface of the quantum dot-polymer composite.

A quantum dot is a light emitting material having high color purity and improved color reproducibility, and thus a quantum dot-polymer composite obtained by dispersing the quantum dot in a polymer host matrix is widely used as various lighting elements, or a light emitting diode used in a backlight unit for a display or a quantum dot sheet for improving display quality of the display. The quantum dot-polymer composite may include various barrier films for protecting the quantum dot included therein from oxygen and moisture. Most of the barrier films have a thin layer of a metal oxide such as $SiO_2$, $TiO_2$, or $Al_2O_3$ on a polymer substrate. The thin layer of the metal oxide is formed via physical deposition (e.g., sputtering or thermal evaporation) requiring the use of expensive vacuum equipment, plasma enhanced chemical vapor deposition (PECVD), and atomic layer deposition. In addition, most of the conventional barrier films are expensive because they include at least two metal oxide layers in order to decrease the number of pinhole defects.

Technologically, most of the conventional barrier films for a QD-polymer composite include the metal oxide layer directly contacting the QD-polymer composite. Such films show poor adhesion properties at an interface between a polymer host matrix and a metal oxide. In order to solve these problems, the surface of the metal oxide layer is coated with an organo-silane compound or an organic/inorganic composite overcoat including siloxane and polyacrylate. However, this may further increase a cost for forming the barrier layer.

On the contrary, the barrier film of the aforementioned embodiments of the present inventive concept may be prepared at a significantly reduced cost, and play a role of a barrier against oxygen and moisture. Unlike the metal oxide layer, the barrier film of the aforementioned embodiments may show relatively high adhesion properties with the surface of the quantum dot polymer composite, thus requiring no particular surface treatment. Furthermore, the barrier film may show high light transmittance, thus having substantially no adverse effect on the luminance properties of the quantum dot.

In an embodiment, the aforementioned quantum dot-polymer composite article may be manufactured by preparing a quantum dot polymer composite and laminating the aforementioned barrier film on at least a portion of a surface (e.g., one or both of the surfaces) of the quantum dot polymer composite in such a manner that the surface of the quantum dot polymer composite and the surface of the second layer face each other. Alternatively, the monomer combination for the thiol-ene polymer is applied to at least a portion of the surface of the quantum dot-polymer composite and is cured (e.g., via UV light) to form the second layer, and then the first layer including the polysilazane and the substrate are laminated thereon to prepare the quantum dot-polymer composite article, but it is not limited thereto.

Details of the barrier film are the same as set forth above. Hereinbelow, the quantum dot-polymer composite article is explained in detail.

The quantum dot-polymer composite may have a sheet shape, a bar shape, a pipe shape, or a tube shape. For example, the quantum dot-polymer composite may be manufactured by using a mold or by casting the material to have various thicknesses and forms.

In the quantum dot-polymer composite, the quantum dot (hereinafter also referred to as a semiconductor nanocrystal) is not particularly limited, and may be any known or commercially available quantum dot. For example, the quantum dot may include a Group II-VI compound, a Group III-V compound, a Group IV-VI compound, a Group IV compound, or a combination thereof. The quantum dot-polymer composite may further include a light emitting particle selected from a metal nanocrystal, a metal oxide nanocrystal, a phosphor, a pigment, and a combination thereof as needed.

The Group II-VI compound may be selected from a binary element compound selected from CdSe, CdTe, ZnS, ZnSe, ZnTe, ZnO, HgS, HgSe, HgTe, MgSe, MgS, and a combination thereof; a ternary element compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a combination thereof; and a quaternary element compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a combination thereof. The Group III-V compound may be selected from a binary element compound selected from GaN, GaP, GaAs, GaSb, AlN, AlP, AlAs, AlSb, InN, InP, InAs, InSb, and a combination thereof; a ternary element compound selected from GaNP, GaNAs, GaNSb, GaPAs, GaPSb, AlNP, AlNAs, AlNSb, AlPAs, AlPSb, InNP, InNAs, InNSb, InPAs, InPSb, and a combination thereof; and a quaternary element compound selected from GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a combination thereof. The Group IV-VI compound may be selected from a binary element compound selected from SnS, SnSe, SnTe, PbS, PbSe, PbTe, and a combination thereof; a ternary element compound selected from SnSeS, SnSeTe, SnSTe, PbSeS, PbSeTe, PbSTe, SnPbS, SnPbSe, SnPbTe, and a combination thereof; and a quaternary element compound selected from SnPbSSe, SnPbSeTe, SnPbSTe, and a combination thereof. The Group IV compound may be selected from a singular element compound selected from Si, Ge, and a combination thereof; and a binary element compound selected from SiC, SiGe, and a combination thereof.

The binary element compound, the ternary element compound, or the quaternary element compound may be present in a uniform concentration in a particle, or may be present in a locally different concentration within a single particle. The semiconductor nanocrystal may have a core/shell structure, wherein a semiconductor nanocrystal surrounds another (different) semiconductor nanocrystal. The core and shell may have an interface, and an element of at least one of the core or the shell in the interface may have a concentration gradient wherein the concentration of the element(s) of the shell decreases toward the core. The semiconductor nanocrystal may have one core of a semiconductor nanocrystal and multi-shells surrounding the core. The core and multi-shell structure has at least two shells, wherein each shell may be a single composition, an alloy, or one having a concentration gradient.

In addition, in the semiconductor nanocrystal, the materials of the shell may have a larger energy bandgap than that of the core, and thereby the semiconductor nanocrystal may exhibit a quantum confinement effect more effectively. In case of a multi-shell type of semiconductor nanocrystal particle, the bandgap of the material of an outer shell may have higher energy than that of the material of an inner shell (a shell that is closer to the core). In this case, the semiconductor nanocrystal may emit light of a wavelength ranging from UV to infrared light.

The semiconductor nanocrystal may have quantum efficiency of greater than or equal to about 10%, for example, greater than or equal to about 30%, greater than or equal to about 50%, greater than or equal to about 60%, greater than or equal to about 70%, or greater than or equal to about 90%.

The semiconductor nanocrystal may be designed to have a wider or narrower full width at half maximum (FWHM) in its photoluminescence spectrum depending on its application. By way of an example, for use in display devices, the semiconductor nanocrystal may have a narrower FWHM so as to realize enhanced color purity or color reproducibility. The semiconductor nanocrystal may have a FWHM of less than or equal to about 45 nanometers (nm), for example less than or equal to about 40 nm, or less than or equal to about 30 nm. While not wishing to be bound by a theory, it is understood that within such ranges, a device including the semiconductor nanocrystal may have enhanced color purity or improved color reproducibility.

The quantum dots may have a particle diameter (the longest diameter in case of a non-spherical particle) ranging from about 1 nm to about 100 nm. For example, the quantum dots may have a particle diameter (the longest diameter in case of a non-spherical particle) ranging about 1 nm to 20 nm.

The shape of the quantum dots is not particularly limited. By way of an example, the quantum dots may have a spherical shape, a pyramidal shape, a multi-arm shape, or a cubic shape. The quantum dots may be in the form of nanoparticles, nanotubes, nanowires, nanofibers, or nanosheets.

The quantum dots may be commercially available or may be prepared by any method. For example, the quantum dots may be prepared by the method described hereinbelow, but it is not limited thereto.

In a non-limiting example, the quantum dots having a several nanometer size may be prepared via a wet chemical method. In the wet chemical method, precursors react in an organic solvent to grow nanocrystal particles, and the organic solvent or a ligand compound may coordinate the surface of the quantum dots, controlling the crystal growth. As the coordinated organic solvents on the surface of the quantum dots may adversely affect the stability of the device, extra organic materials not coordinating the surface of the quantum dots may be removed by adding the quantum dots in an excess amount of a non-solvent and centrifuging the resulting combination. Examples of the non-solvent may include, but are not limited to, acetone, ethanol, methanol, and the like. After the removal of extra organic materials, the amount of the organic materials coordinated on the surface of the quantum dots may be less than or equal to about 35% by weight.

The organic materials may include a ligand compound, an organic solvent, or a combination thereof. The ligand compound may be any organic compound that may be used as a ligand compound in the wet chemical method, and the types thereof are not particularly limited. For example, the ligand compound may be $RCOOH$, $RNH_2$, $R_2NH$, $R_3N$, $RSH$, $R_3PO$, $R_3P$, $ROH$, $RCOOR'$, $RPO(OH)_2$, $R_2POOH$ (wherein R and R' are independently a C1 to C24 alkyl group or a C5 to C20 aryl group), or a combination thereof. The organic ligand compound may be coordinated to the surface of the quantum dots as prepared, playing a role of well-dispersing the quantum dots in a solution, and affecting the light-emitting and electrical characteristics of the quantum dots. Examples of the organic ligand compound may include, but are not limited to: a thiol such as methane thiol, ethane thiol, propane thiol, butane thiol, pentane thiol, hexane thiol, octane thiol, dodecane thiol, hexadecane thiol, octadecane thiol, and benzyl thiol; an amine such as methane amine, ethane amine, propane amine, butane amine, pentane amine, hexane amine, octane amine, dodecane amine, hexadecyl amine, octadecyl amine, dimethyl amine, diethyl amine, and dipropyl amine; an acid such as methanoic acid, ethanoic acid, propanoic acid, butanoic acid, pentanoic acid, hexanoic acid, heptanoic acid, octanoic acid, dodecanoic acid, hexadecanoic acid, octadecanoic acid, oleic acid, and benzoic acid; a phosphine such as methyl phosphine, ethyl phosphine, propyl phosphine, butyl phosphine, pentyl phosphine, and the like; an oxide compound thereof such as methyl phosphine oxide, ethyl phosphine oxide, propyl phosphine oxide, butyl phosphine oxide, and the like; diphenyl phosphine, a triphenyl phosphine compound, or an oxide compound thereof; and phosphonic acid. The organic ligand compound may be used alone or as a combination of two or more compounds. The solvent may be any one used in the wet chemical method, and the types thereof are not particularly limited. For example, the solvent may be selected from a C6 to C22 primary alkylamine such as hexadecylamine; a C6 to C22 secondary alkylamine such as dioctylamine; a C6 to C40 tertiary alkylamine such as trioctylamine; a nitrogen-containing heterocyclic compound such as pyridine; a C6 to C40 aliphatic hydrocarbon (e.g., alkane, alkene, alkyne, and the like) such as hexadecane, octadecane, octadecene, and squalane; a C6 to C30 aromatic hydrocarbon such as phenyldodecane, phenyltetradecane, and phenyl hexadecane; a phosphine substituted with a C6 to C22 alkyl group such as trioctylphosphine; a phosphine oxide substituted with a C6 to C22 alkyl group such as trioctylphosphine oxide; and a C12 to C22 aromatic ether such as phenyl ether, benzyl ether, and a combination thereof, but it is not limited thereto.

The quantum dot-polymer composite may be prepared by using any known method or may be commercially available. In non-limiting examples, the quantum dot-polymer composite may be prepared by mixing the above quantum dots or their organic solvent dispersion (e.g., a quantum dot dispersion in chloroform, hexene, or a liquid acryl monomer) with a polymer for a host matrix or its precursor (e.g., a monomer or an oligomer), selectively removing the solvent, and performing polymerization (or a cross-linking reaction) (by heating or radiating light), if needed.

The polymer or precursor (e.g., a monomer or oligomer) for the host matrix may include a thiol-ene polymer, a cross-linked or non-cross-linked poly(meth)acrylate, an epoxy polymer, an epoxy(meth)acrylate polymer, a silicone polymer, a silicon(meth)acrylate polymer, a polyurethane (meth)acrylate, a melamine(meth)acrylate polymer, a vinyl polymer, or a combination thereof, but is not limited thereto. Details for the first monomer and the second monomer are the same as described above. The polymers may be easily prepared by any known method, or polymers having desirable molecular weights or precursors (e.g., monomers or oligomers having a molecular weight of 1,000 to 20,000 grams per mole (g/mol)) may be commercially available.

In another embodiment, an electronic device including the quantum dot-polymer composite article is provided. The electronic device may be a display, a light emitting device such as a backlight unit for a liquid crystal display device, a memory device, a laser device, or a solar cell. The light emitting device includes a light source, and the quantum dot-polymer composite article is positioned on the light source so that light emitted from the light source transmits through the article.

The device may be manufactured according to any known method in the art, details of which are also known. In non-limiting examples, a backlight unit for a liquid crystal display device is described hereinbelow.

The backlight unit includes an LED light source, and a light conversion layer disposed separately from the LED light source to convert light emitted from the LED light source to white light and to provide the white light to a liquid crystal panel.

The backlight unit may further include a light guide panel disposed between the LED light source and the light conversion layer.

The light conversion layer includes the quantum dot-polymer composite article. Details of quantum dot-polymer composite article are the same as described above. Hereinbelow, a backlight unit according to an embodiment and a liquid crystal display device including the same are explained with reference to the drawings.

Figure 5:
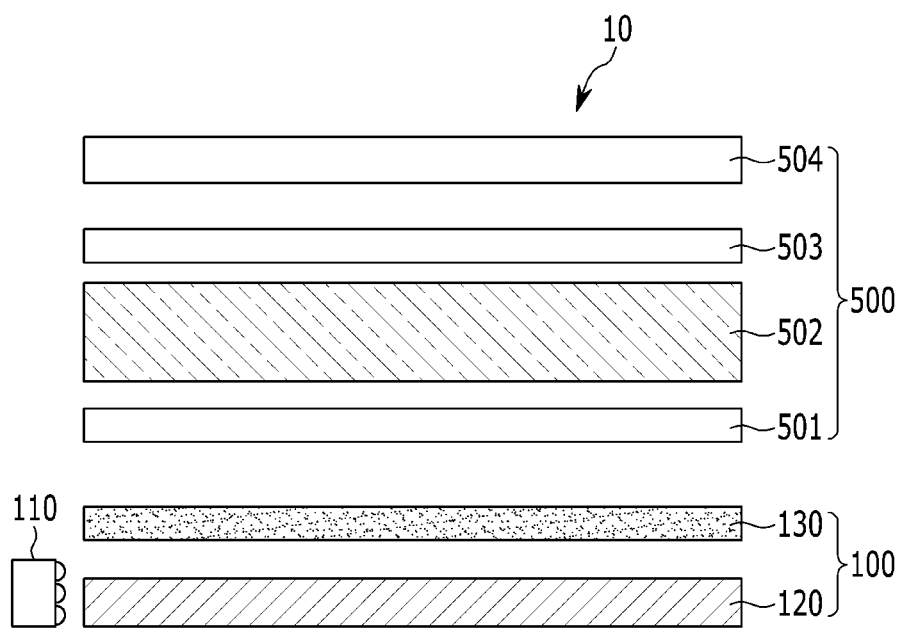
FIG. 5 is a schematic view showing a liquid crystal display device to which a backlight unit including a quantum dot-polymer composite article according to an embodiment is applied.

FIG. 5 is a schematic view of a liquid crystal display device 10 including a backlight unit in accordance with an embodiment.

Referring to FIG. 5, the liquid crystal display device 10 includes a backlight unit 100 and a liquid crystal panel 500 to provide a predetermined colored image using white light provided from the backlight unit 100.

The backlight unit 100 includes a light emitting diode ("LED") light source 110, a light conversion layer 130 to convert light emitted from the LED light source 110 to white light, and a light guide panel 120 disposed therebetween to guide the light emitted from the LED light source 110 to the light conversion layer 130. The LED light source 110 includes a plurality of LED chips emitting light having predetermined wavelengths. The LED light source 110 may be a blue light-emitting LED light source or an ultraviolet (UV)-emitting LED light source, for example.

A reflector (not shown) may be further disposed on the lower surface of the light guide panel 120.

The light conversion layer 130 is spaced apart from the LED light source 110 by a predetermined distance and converts light emitted from the LED light source 110 to white light, which is then transmitted to the liquid crystal panel 500.

The light conversion layer 130 includes the quantum dot-polymer composite article according to an embodiment. Details of the quantum dot-polymer composite article are the same as described above.

The backlight unit 100 may further include a diffusion plate on a light guide panel 120, and the light conversion layer 130 may be disposed between the light guide panel and the diffusion plate, or on a side of the diffusion plate which is opposite the light guide panel. Materials and structures for each of the LED light source 110, the light guide panel, the diffusion plate, and the liquid crystal panel are known in the art and are commercially available, and thus are not particularly limited.

When the light emitted from the LED light source 110 is passed through the light conversion layer 130, blue light, green light, and red light are mixed to emit white light. By changing the compositions and sizes of semiconductor nanocrystals in the light conversion layer 130, the blue light, green light, and red light may be varied to a desirable ratio, thereby providing white light that provides excellent color reproducibility and color purity.

In an embodiment, the light conversion layer 130 may include a plurality of layers. In an embodiment, the plurality of layers may be disposed so that the light emitting wavelength becomes longer in a direction towards the LED light source 110. For example, if the LED light source 110 is a blue LED light source, the light conversion layer 130 may include a red light conversion layer and a green light conversion layer that are sequentially stacked in a direction away from the LED light source 110.

Even though not shown in FIG. 5, on the light conversion layer 130, a film, e.g., a diffusion plate, a prism sheet, a microlens sheet, a brightness enhancement film (e.g., double brightness enhancement film ("DBEF")), or a combination thereof, may be further disposed. In addition, the light conversion layer 130 may be disposed between at least two films, e.g., a light guide panel, a diffusion plate, a prism sheet, a micro-lens sheet, a brightness enhancement film (e.g., a double brightness enhancement film ("DBEF")), or a combination thereof.

The white light emitted from the backlight unit 100 is incident toward the liquid crystal panel 500. The liquid crystal panel 500 provides a predetermined color image using the white light incident from the backlight unit 100. The liquid crystal panel 500 may have a structure in which a first polarizer 501, a liquid crystal layer 502, a second polarizer 503, and a color filter 504 are sequentially disposed. The white light emitted from the backlight unit 100 is transmitted through the first polarizer 501, the liquid crystal layer 502, and the second polarizer 503, and then into the color filter 504 to form a predetermined color image.

The liquid crystal panel is not particularly limited, and any liquid crystal panel that is known in the art or is commercially available may be included. Details for the liquid crystal display device are the same as set forth above.

Hereinafter, the embodiments are illustrated in more detail with reference to examples. However, they are exemplary embodiments, and the present inventive concept is not limited thereto.

EXAMPLES

Example 1

[1] Preparation of a Coating Solution 5 g (grams) of perhydroxy polysilazane (manufactured by Merck AZ Electronic Materials Co., Ltd., product name: NN120A, solid content 20 percent by weight (wt %)) is diluted with 20 g of dibutyl ether, and 0.1 g of N,N-dimethyl ethanol amine (manufactured by Aldrich Co., Ltd.) is added thereto to prepare a polysilazane coating solution.

30 g of pentaerythritol tetrakis(3-mercaptopropionate) (Supplier Aldrich), 20 g of 1,3,5-triallyl-1,3,5-triazine-2,4, 6(1H,3H,5H)-trione (Supplier: Aldrich), 0.05 g of Irgacure TPO (Manufacturer: BASF), and 0.45 g of Irgacure 754 (Manufacturer: BASF) as a photoinitiator are mixed to prepare a monomer mixture.

[2] Preparation of a Barrier Film

The polysilazane coating solution thus obtained is bar-coated on a 125 micrometer (μm)-thick PET base film (Teijin DuPont Films Co. Ltd., product name: KDL86W) with a wire bar to form a layer having a thickness of 400 nanometers (nm), and dried in an atmosphere at a temperature of 140° C. for one minute. The resulting product is exposed to ultraviolet (UV) radiation from a high pressure mercury lamp in an atmosphere for 10 seconds to obtain a first layer including an oxidation product of the polysilazane.

Figure 6:
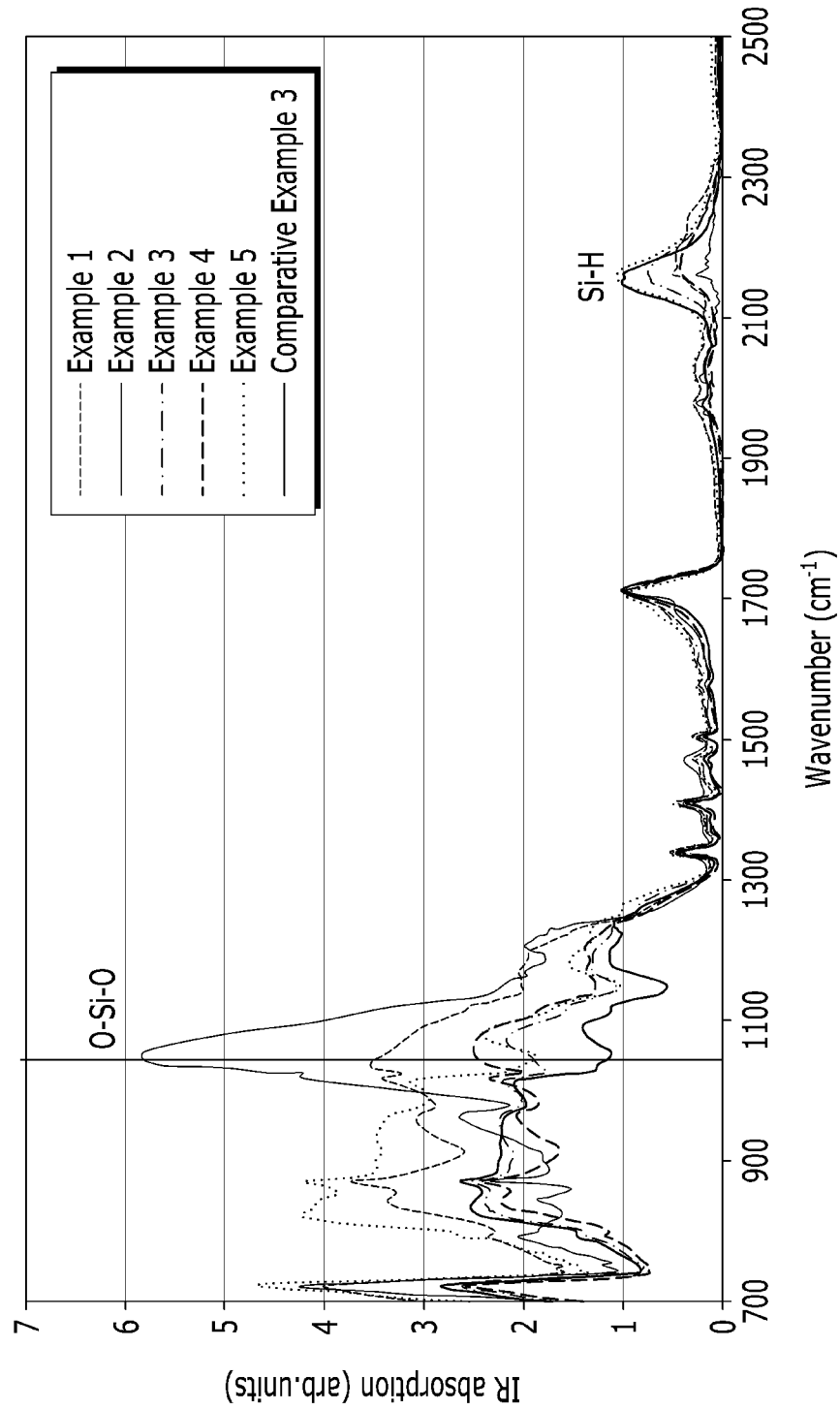
FIG. 6 is a graph of absorption (arbitrary units, arb. units) versus wavenumber (reverse centimeters, $cm^{-1}$) showing the FTIR spectrum of a layer of an oxidation product of polysilazane formed in the examples and the comparative examples.

A Fourier Transform Infrared Spectrum (FTIR) analysis is carried out for the first layer thus obtained, and the results are shown in FIG. 6. The ratio of SiO/SiH (i.e., the ratio of the SiO peak with respect to the SiH peak) is determined from the results of FIG. 6, and the determined value is listed in Table 1.

The thiol-ene monomer mixture thus obtained is bar-coated on the first layer prepared above with a wire bar to form a layer having a thickness of 50 micrometers (um), and is subsequently photo-cured by exposure to UV (light intensity: 1,500 milli Joules per square centimeter (mJ/cm$^2$)) for 30 seconds to form a second layer including a thiol-ene polymer. As a result, the barrier film thus prepared includes the first layer of the oxidation product of the polysilazane and the second layer that is disposed directly on the first layer and that includes the thiol-ene polymer.

Example 2

A barrier film is prepared in the same manner as set forth in Example 1, except for the following.

The polysilazane coating solution thus obtained is bar-coated on a 125 μm-thick PET base film (Teijin DuPont Films Co. Ltd., product name: KDL86W) with a wire bar to form a layer having a thickness of 400 nm, dried in an atmosphere at a temperature of 140° C. for one minute, and subsequently kept in a chamber having constant temperature and constant humidity at 60° C. and 95% relative humidity for 12 hours to form a first layer including the oxidation product of the polysilazane.

A Fourier Transform Infrared Spectrum (FTIR) analysis is made for the first layer thus obtained, and the results are shown in FIG. 6. The ratio of SiO/SiH is determined from the results of FIG. 6, and the determined value is listed in Table 1.

Example 3

A barrier film is prepared in the same manner as set forth in Example 1, except for the following.

N,N,N',N'-tetramethyl-1,6-hexadiamine (manufactured by Aldrich Co., Ltd.) is used as a catalyst for the preparation of the polysilazane coating solution.

A Fourier Transform Infrared Spectrum (FTIR) analysis is carried out for the first layer thus obtained, and the results are shown in FIG. 6. The ratio of SiO/SiH is determined from the results of FIG. 6, and the determined value is listed in Table 1.

Example 4

A barrier film is prepared in the same manner as set forth in Example 1, except for the following.

5 g of perhydroxypolysilazane (manufactured by Merck AZ electronic materials Co., Ltd., product name: NAX120, solid content 20 wt %) is diluted with 20 g of dibutyl ether to obtain the polysilazane coating solution.

A Fourier Transform Infrared Spectrum (FTIR) analysis is carried out for the first layer thus obtained and the results are shown in FIG. 6. The ratio of SiO/SiH is determined from the results of FIG. 6, and the determined value is listed in Table 1.

Example 5

A barrier film is prepared in the same manner as set forth in Example 1, except for the following.

5 g of perhydroxypolysilazane (manufactured by Merck AZ electronic materials Co., Ltd., product name: NL120, solid content 20 wt %) is diluted with 20 g of dibutyl ether to obtain the polysilazane coating solution.

A Fourier Transform Infrared Spectrum (FTIR) analysis is carried out for the first layer thus obtained and the results are shown in FIG. 6. The ratio of SiO/SiH is determined from the results of FIG. 6, and the determined value is listed in Table 1.

Example 6

A barrier film is prepared in the same manner as set forth in Example 1, except for the following.

For the preparation of the thiol-ene monomer mixture, 2.5 g of clay modified with a tertiary amine on its surface is further added.

A Fourier Transform Infrared Spectrum (FTIR) analysis is carried out for the first layer thus obtained and the results are listed in Table 1.

Example 7

30 g of pentaerythritol tetrakis(3-mercaptoacetate) (Supplier: Aldrich), 20 g of 1,3,5-triallyl-1,3,5-triazine-2,4,6(1H, 3H,5H)-trione (Supplier: Aldrich), 0.05 g of Irgacure TPO (Manufacturer: BASF), 0.45 g of Irgacure 754 (Manufacturer: BASF) as a photoinitiator, and 2.5 g of clay modified with a tertiary amine on its surface (manufactured by Co-op Chemical Co., Ltd., product name: STN) are mixed to prepare a thiol-ene monomer mixture. A barrier film is prepared in the same manner as set forth in Example 1, except for using the thiol-ene monomer mixture thus prepared above.

A Fourier Transform Infrared Spectrum (FTIR) analysis is carried out for the first layer thus obtained, the ratio of SiO/SiH is determined from the results, and the determined value is listed in Table 1.

Comparative Example 1

[1] Preparation of a Coating Solution 5 g of perhydroxy polysilazane (manufactured by Merck AZ Electronic Materials Co., Ltd., product name: NN120A, solid content 20 wt %) is diluted with 20 g of dibutyl ether to prepare a polysilazane coating solution.

[2] Preparation of a Barrier Film

The polysilazane coating solution thus obtained is bar-coated on a 125 μm-thick PET base film (Teijin DuPont Films Co. Ltd., product name: KDL86W) with a wire bar to form a layer having a thickness of 400 nm, dried in an atmosphere at a temperature of 100° C. for 15 minutes, and is subsequently exposed to UV light from a Xe Excimer lamp (manufactured by MD Excimer Co., Ltd., model name: MEUT-3-1500) to form a layer including an oxidation product of the polysilazane and to obtain a barrier film.

Figure 7:
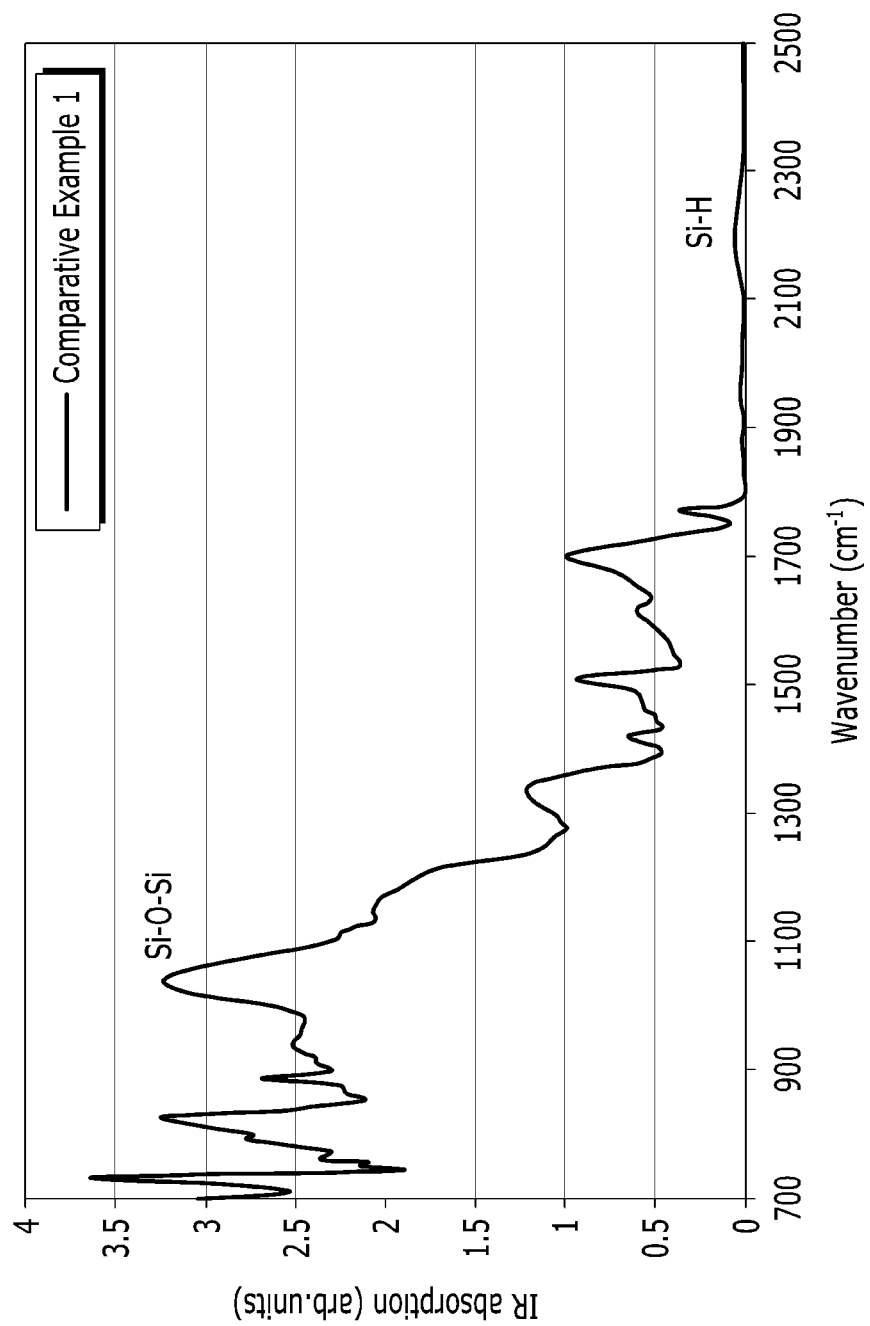
FIG. 7 is a graph of absorption (arbitrary units, arb. units) versus wavenumber (reverse centimeters, $cm^{-1}$) showing the FTIR spectrum of a layer of an oxidation product of polysilazane formed in Comparative Example 1.

A Fourier Transform Infrared Spectrum (FTIR) analysis is carried out for the first layer thus obtained, and the results are shown in FIG. 7. The ratio of SiO/SiH is determined from the results of FIG. 7, and the determined value is listed in Table 1.

Comparative Example 2

A barrier film is prepared in the same manner as set forth in Example 1, except for the following.

Instead of the second layer including the thiol-ene polymer, the polysilazane coating solution thus obtained is bar-coated on the first layer with a wire bar to form a layer having a thickness of 400 nm, dried in an atmosphere at a temperature of 140° C. for one minute, and is subsequently exposed to UV light from high pressure mercury lamp to form a layer including an oxidation product of the polysilazane and to obtain a barrier film.

A Fourier Transform Infrared Spectrum (FTIR) analysis is carried out for the first layer thus obtained. The ratio of SiO/SiH is determined and is listed in Table 1.

Comparative Example 3

A barrier film is prepared in the same manner as set forth in Example 1, except that no catalyst is used during the polysilazane coating solution.

A Fourier Transform Infrared Spectrum (FTIR) analysis is carried out for the first layer thus obtained, and the results are shown in FIG. 6. The ratio of SiO/SiH is determined from the results of FIG. 6, and the determined value is listed in Table 1.

Comparative Example 4

[1] Preparation of a Coating Solution 30 g of pentaerythritol tetrakis(3-mercaptopropionate) (Supplier: Aldrich), 20 g of 1,3,5-triallyl-1,3,5-triazine-2,4,6(1H,3H,5H)-trione (Supplier: Aldrich), 0.05 g of Irgacure TPO (Manufacturer: BASF), and 0.45 g of Irgacure 754 as a photoinitiator are mixed to prepare a thiol-ene monomer mixture.

[2] Preparation of a Barrier Film

The thiol-ene monomer mixture thus obtained is bar-coated on a 125 μm-thick PET base film (Teijin DuPont Films Co. Ltd., product name: KDL86W) with a wire bar to form a layer having a thickness of 50 um, and then is photo-cured by exposure to UV (light intensity: 1500 mJ/cm$^2$) for 30 seconds to form a second layer including a thiol-ene polymer. As a result, the barrier film thus prepared includes the first layer including the crosslinked thiol-ene polymer.

Examples 8 to 14: Preparation of Quantum Dot-Polymer Composite Articles and Evaluation of their Long Term Reliability

[1] Preparation of Quantum Dot Polymer Composite

A monomer and oligomer mixture is prepared by mixing 30 parts by weight of lauryl methacrylate, 36 parts by weight of tricyclodecane dimethanol diacrylate, 4 parts by weight of trimethylolpropane triacrylate, 20 parts by weight of an epoxy diacrylate oligomer (Manufacturer: Sartomer), 1 part by weight of 1-hydroxy-cyclohexyl-phenylketone, and 1 part by weight of 2,4,6-trimethylbenzoyl-diphenyl-phosphine oxide. The mixture is defoamed under vacuum.

A toluene dispersion including InP/ZnS semiconductor nanocrystals obtained after removal of an excessive amount of an organic material through centrifugation [concentration: (absorption at 449 nm)×(volume of QD solution (mL)) =3.75] is mixed with an excess amount of ethanol, and the mixture is centrifuged again. The separated semiconductor nanocrystal is dispersed in 0.15 g of lauryl methacrylate (10 parts by weight of the entire composition except for an initiator), then added to 1.35 g of the prepared monomer (oligomer) mixture, and the resulting mixture is stirred to provide a semiconductor nanocrystal composition.

About 1 g of the semiconductor nanocrystal composition is drop-casted on a PET film having a sputtered SiO$_x$ film as a barrier layer on one surface. On the semiconductor nanocrystal composition as drop-casted, the barrier film prepared in Example 1, Example 2, Example 3, Example 4, Example 5, Example 6, or Example 7 is disposed with the surface of the second layer being in contact with the composition and cured by UV (light intensity: 100 milli Watts per square centimeter (mW/cm$^2$)) for 10 seconds to obtain a quantum dot-polymer composite article of Example 8, Example 9, Example 10, Example 11, Example 12, Example 13, or Example 14.

[2] Long-Term Reliability Experiment

The quantum dot-polymer composite article is inserted between a light guide plate and an optical film of a 60 inch TV equipped with a blue LED having a peak wavelength of 449 nm, and then the TV is operated to measure brightness at about 45 centimeters (cm) in front of the TV with a spectroradiometer (manufactured by Konica Minolta Co., Ltd., CS-2000). The TV is operated in a high temperature chamber of 50° C. to measure changes in luminance over time. The results are listed in Table 1. In Table 1, "0" denotes the case where the decrease in luminance is less than about 10%, while "X" denotes the case where the decrease in luminance is over about 10%. The long term reliability test results for the article of some of the examples are also shown in FIG. 8.

Figure 8:
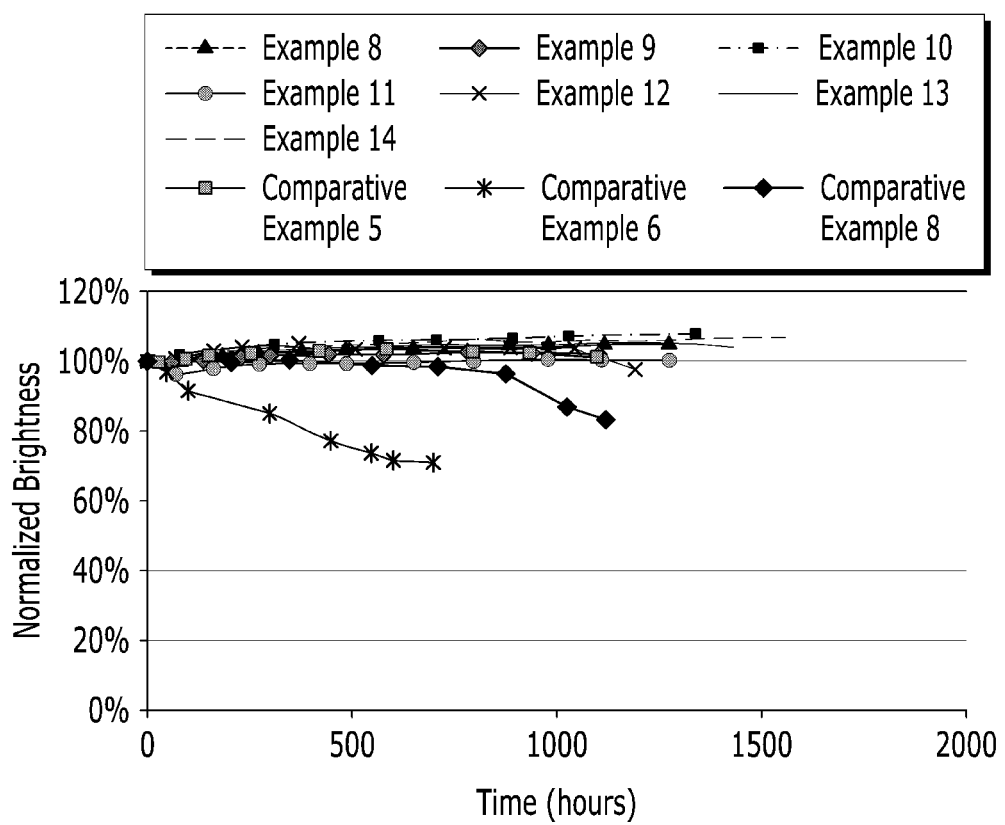
FIG. 8 is a graph of normalized brightness (percent, %) versus time (hours, h) showing long-term reliability test results of quantum dot-polymer composite articles according to the examples and the comparative examples.

The results of Table 1 and FIG. 8 confirm that the quantum dot-polymer composite article may maintain substantially the initial luminance for at least 1,300 hours or longer.

Comparative Examples 5 to 8: Preparation of Quantum Dot-Polymer Composite Articles and Evaluation of their Long Term Reliability

[1] Preparation of Quantum Dot Polymer Composite

Quantum dot-polymer composite articles of Comparative Examples 5, 6, 7, and 8 are prepared in the same manner as set forth in the examples except for using the barrier films of Comparative Examples 1 to 4.

[2] For the quantum dot-polymer composite articles thus prepared, a long term reliability test is made in the same manner as set forth in the examples, and the results are listed in Table 1. The long term reliability test results for the articles of Comparative Examples 5 and 6 are also shown in FIG. 8.

TABLE 1

|  |  | Barrier film | Long term reliability | Si—O/Si—H the first layer |
|---|---|---|---|---|
| Example 8 | First layer | Oxidation product of the polysilazane | ○ | 6.18 |
|  | Catalyst | N,N-dimethylethanolamine |  |  |
|  | Oxidation of the polysilazane | 140° C., one minute drying + UV irradiation |  |  |
|  | Second layer | 4T-TTT polymer |  |  |
| Example 9 | First layer | Oxidation product of the polysilazane | ○ | 12.14 |
|  | Catalyst | N,N-dimethylethanolamine |  |  |
|  | Oxidation of the polysilazane | 140° C., one minute drying + being kept at 60° C. & 95% RH for 12 h |  |  |
|  | Second layer | 4T-TTT polymer |  |  |

TABLE 1-continued

| | Barrier film | | Long term reliability | Si—O/Si—H the first layer |
|---|---|---|---|---|
| Example 10 | First layer | Oxidation product of the polysilazane | ○ | 2.96 |
| | Catalyst | N,N,N',N'-tetramethylethylenediamine | | |
| | Oxidation of the polysilazane | 140° C., one minute drying + UV irradiation | | |
| | Second layer | 4T-TTT polymer | | |
| Example 11 | First layer | Oxidation product of the polysilazane | ○ | 4.81 |
| | Catalyst | NAX120-20 (Amine based) | | |
| | Oxidation of the polysilazane | 140° C., one minute drying | | |
| | Second layer | 4T-TTT polymer | | |
| Example 12 | First layer | Oxidation product of the polysilazane | ○ | 3.24 |
| | Catalyst | NL120-20 (Pd based) | | |
| | Oxidation of the polysilazane | 140° C., one minute drying | | |
| | Second layer | 4T-TTT polymer | | |
| Example 13 | First layer | Oxidation product of the polysilazane | ○ | 6.18 |
| | Catalyst | N,N-dimethylethanolamine | | |
| | Oxidation of the polysilazane | 140° C., one minute drying + UV irradiation | | |
| | Second layer | 4T-TTT polymer containing organo modified clay | | |
| Example 14 | First layer | Oxidation product of the polysilazane | ○ | 6.18 |
| | Catalyst | N,N-dimethylethanolamine | | |
| | Oxidation of the polysilazane | 140° C., one minute drying + UV irradiation | | |
| | Second layer | PE-TSA-TTT polymer containing organo-modified clay | | |
| Comp. Example 5 | First layer | Oxidation product of the polysilazane | ○ | 28 |
| | Catalyst | — | | |
| | Oxidation of the polysilazane | Excimer UV irradiation | | |
| | Second layer | — | | |
| Comp. Example 6 | First layer | Oxidation product of the polysilazane | X | 6.18 |
| | Catalyst | N,N-dimethylethanolamine | | |
| | Oxidation of the polysilazane | 140° C., one minute drying + UV irradiation | | |
| | Second layer | Oxidation product of the polysilazane | | |
| | Catalyst | N,N-dimethylethanolamine | | |
| | Oxidation of the polysilazane | 140° C., one minute drying + UV irradiation | | |
| Comp. Example 7 | First layer | Oxidation product of the polysilazane | X | 0.1 |
| | Catalyst | — | | |
| | Oxidation of the polysilazane | 140° C., one minute drying + UV irradiation | | |
| | Second layer | 4T-TTT polymer | | |
| Comp. Example 8 | First layer | 4T-TTT polymer | X | — |
| | Catalyst | — | | |
| | Oxidation of the polysilazane | — | | |
| | Second layer | — | | |

The results of Table 1 confirm that the SiO/SiH ratio of the first layer in the barrier films of Examples 1 to 4 falls within a range of greater than 0.1 and less than 15. The quantum dot polymer composites of Examples 8 to 14 including the barrier films of Examples 1 to 7 may show long-term reliability that is comparable to Comparative Example 5 using an excimer laser and is significantly better than the articles of Comparative Examples 6 to 8.

While this inventive concept has been described in connection with what is presently considered to be practical exemplary embodiments, it is to be understood that the present inventive concept is not limited to the disclosed embodiments, but, on the contrary, is intended to cover various modifications and equivalent arrangements included within the spirit and scope of the appended claims.

What is claimed is:

1. A quantum dot-polymer composite article comprising:
   a quantum dot-polymer composite comprising a polymer host matrix and a plurality of quantum dots dispersed in the polymer host matrix; and
   a barrier film disposed on at least a portion of surface of the quantum dot-polymer composite, wherein the barrier film comprises:
a substrate;
a first layer disposed on the substrate and comprising an oxidation product of polysilazane, wherein the polysilazane consists of a repeating unit represented by Chemical Formula 1, wherein each occurrence of the repeating unit represented by Chemical Formula 1 may be the same or different, Chemical Formula 1

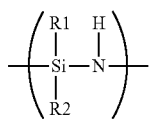

wherein $R^1$ and $R^2$ are each independently hydrogen, an aliphatic hydrocarbon group, an alicyclic hydrocarbon group, an alkylsilyl group, an alkylamino group, an alkoxy group, or an aromatic hydrocarbon group; and
a second layer disposed directly on the first layer and comprising a thiol-ene polymer, the thiol-ene polymer comprising a polymerization product of a first monomer having at least two thiol groups, wherein at least one thiol group is present at one terminal end and at least one thiol group is present at another terminal end, and a second monomer represented by Chemical Formula 3,

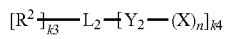

wherein, in Chemical Formula 3,
X is an aliphatic organic group comprising a carbon-carbon double bond or a carbon-carbon triple bond, an aromatic organic group comprising a carbon-carbon double bond or a carbon-carbon triple bond, or an alicyclic organic group comprising a carbon-carbon double bond or a carbon-carbon triple bond,
$R^2$ is selected from hydrogen; a substituted or unsubstituted C1 to C30 linear or branched alkyl group; a substituted or unsubstituted C6 to C30 aryl group; a substituted or unsubstituted C3 to C30 heteroaryl group; a substituted or unsubstituted C3 to C30 cycloalkyl group; a substituted or unsubstituted C3 to C30 heterocycloalkyl group; a C1 to C10 alkoxy group; a hydroxy group; NH2; a substituted or unsubstituted C1 to C30 amine group (-NRR', wherein R and R' are independently hydrogen or a C1 to C30 linear or branched alkyl group); an isocyanate group; a halogen; -ROR' (wherein R is a substituted or unsubstituted C1 to C20 alkylene group and R' is hydrogen or a C1 to C20 linear or branched alkyl group); an acyl halide (-RC(=O)X, wherein R is a substituted or unsubstituted alkylene group and X is a halogen); —C(=O)OR' (wherein R' is hydrogen or a C1 to C20 linear or branched alkyl group); —CN; or —C(=O)ONRR' (wherein R and R' are independently hydrogen or a C1 to C20 linear or branched alkyl group),
L2 is a carbon atom, a substituted or unsubstituted C1 to C30 alkylene group, a substituted or unsubstituted C6 to C30 cycloalkylene group, a substituted or unsubstituted C6 to C30 arylene group, or a substituted or unsubstituted C3 to C30 heteroarylene group,
$Y_2$ is a single bond; a substituted or unsubstituted C1 to C30 alkylene group; a substituted or unsubstituted C2 to C30 alkenylene group; or a C1 to C30 alkylene group or a C2 to C30 alkenylene group wherein at least one methylene (-CH$_2$-) group is replaced by sulfonyl (-S(=O)$_2$-), carbonyl (-C(=O)-), ether (—O—), sulfide (—S—), sulfoxide (-S(=O)-), ester (-C(=O)O—), amide (-C(=O)NR-) (wherein R is hydrogen or a C1 to C10 linear or branched alkyl group), imine (—NR—) (wherein R is hydrogen or a C1 to C10 linear or branched alkyl group), or a combination thereof, n is an integer of 1 or more,
k3 is an integer of 0 or more,
k4 is an integer of 1 or more, and
the sum of n and k4 is an integer of 3 or more,
provided that when $Y_2$ is not a single bond, n does not exceed the valence of $Y_2$, and
provided that the sum of k3 and k4 does not exceed the valence of $L_2$ and
wherein a surface of the second layer contacts at least a portion of the surface of the quantum dot-polymer composite.

2. The quantum dot-polymer composite article of claim 1, wherein the polymer host matrix comprises a thiol-ene polymer, a cross-linked or non-cross-linked poly(meth)acrylate, a melamine(meth)acrylate polymer, an epoxy polymer, an epoxy(meth)acrylate polymer, a silicone polymer, a silicon(meth)acrylate polymer, a polyurethane(meth)acrylate, a vinyl polymer, or a combination thereof.

3. The quantum dot-polymer composite article of claim 1, wherein the quantum dot-polymer composite has a sheet shape, a bar shape, a pipe shape, or a tube shape.

4. The quantum dot-polymer composite article of claim 1, wherein the oxidation product of the polysilazane consists of a silicon oxide, a silicon oxynitride, a polysiloxane, a polysiloxazane, or a combination thereof.

5. The quantum dot-polymer composite article of claim 1, wherein in the oxidation product of the polysilazane, a ratio of a Si-O moiety to a Si-H moiety determined from FTIR analysis data is greater than or equal to about 0.1 and less than or equal to about 15.

6. An electronic device comprising the quantum dot-polymer composite article of claim 1.

7. The electronic device of claim 6, wherein the electronic device is a display, a light emitting device, a memory device, a laser device, or a solar cell.

8. The electronic device of claim 7, wherein the light emitting device comprises a light source and the quantum dot-polymer composite article positioned on the light source.

* * * * *